US008965038B2

(12) United States Patent
Liu

(10) Patent No.: US 8,965,038 B2
(45) Date of Patent: Feb. 24, 2015

(54) STEGANALYSIS WITH NEIGHBORING JOINT DENSITY

(71) Applicant: Qingzhong Liu, Huntsville, TX (US)

(72) Inventor: Qingzhong Liu, Huntsville, TX (US)

(73) Assignee: Sam Houston University, Huntsville, TX (US)

( * ) Notice: Subject to any disclaimer, the term of this patent is extended or adjusted under 35 U.S.C. 154(b) by 116 days.

(21) Appl. No.: 13/757,399

(22) Filed: Feb. 1, 2013

(65) Prior Publication Data
US 2013/0208941 A1 Aug. 15, 2013

Related U.S. Application Data

(60) Provisional application No. 61/593,752, filed on Feb. 1, 2012.

(51) Int. Cl.
*G06K 9/00* (2006.01)
*G06T 1/00* (2006.01)
*H04N 7/167* (2011.01)

(52) U.S. Cl.
CPC ............... *G06T 1/0021* (2013.01); *G06T 1/005* (2013.01); *G06T 2201/0065* (2013.01); *G06T 2201/0052* (2013.01)
USPC ............................ 382/100; 382/250; 380/201

(58) Field of Classification Search
USPC ......... 382/100, 103, 162, 168, 173, 181, 232, 382/236, 243, 250, 254, 274, 276, 287–294, 382/305, 312; 713/176; 375/240.03; 707/706; 706/21; 380/201
See application file for complete search history.

(56) References Cited

U.S. PATENT DOCUMENTS

| 7,424,464 | B2* | 9/2008 | Oliver et al. | 706/21 |
| 8,281,138 | B2* | 10/2012 | Shi et al. | 713/176 |
| 2003/0072364 | A1* | 4/2003 | Kim et al. | 375/240.03 |
| 2010/0037059 | A1* | 2/2010 | Sun et al. | 713/176 |
| 2012/0095982 | A1* | 4/2012 | Lennington et al. | 707/706 |

OTHER PUBLICATIONS

Pevny T and Fridrich J (2007). Merging Markov and DCT features for multi-class JPEG steganalysis. Proc. SPIE, vol. 6505, 650503, 2007; DOI:10.1117/12.696774.
Kodovsky J and Fridrich J (2009). Calibration revisited. Proceedings of the 11th ACM Multimedia and Security Workshop, Princeton, NJ, Sep. 7-8, 2009.
Kodovsky J, Pevny T and Fridrich J (2010). Modern steganalysis can detect YASS, Proc. SPIE, Electronic Imaging, Media Forensics and Security XII, San Jose, CA, Jan. 17-21, pp. 02-01-02-11, 2010.
Li B, Shi Y and Huang J (2009). Steganalysis of YASS. IEEE Trans. Information Forensics and Security, 4(3):369-382.

\* cited by examiner

*Primary Examiner* — Seyed Azarian
(74) *Attorney, Agent, or Firm* — Meyertons, Hood, Kivlin, Kowert & Goetzel, P.C.; Eric B. Meyertons

(57) ABSTRACT

Systems and methods for detecting hidden messages and information in digital files are described. In an embodiment, a method of detecting steganography in a compressed digital image includes extracting neighboring joint density features from the image under scrutiny. Steganography in the image may be detected based on differences in a neighboring joint density feature of the image.

19 Claims, 11 Drawing Sheets

T=9

T=13

T=15

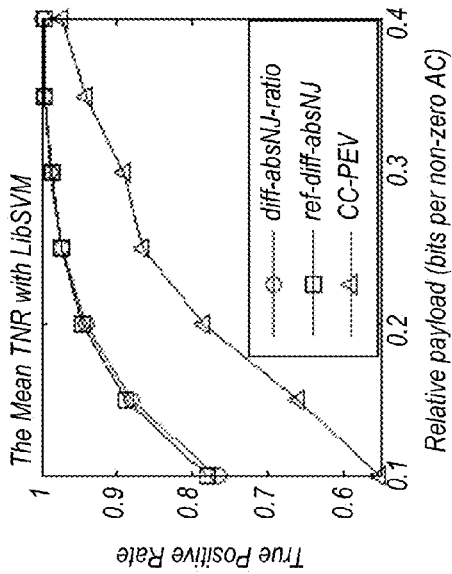
FIG. 4Y-A
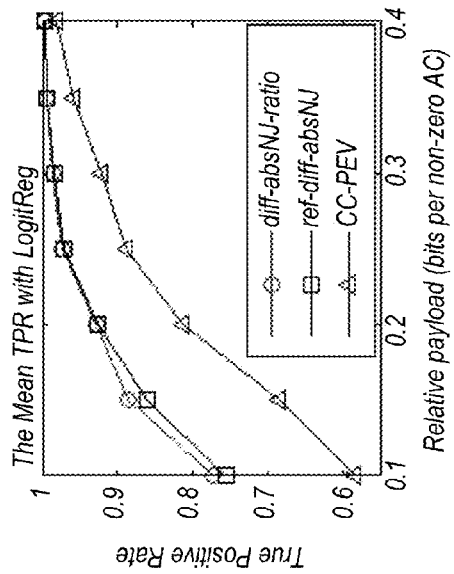
FIG. 4Y-B
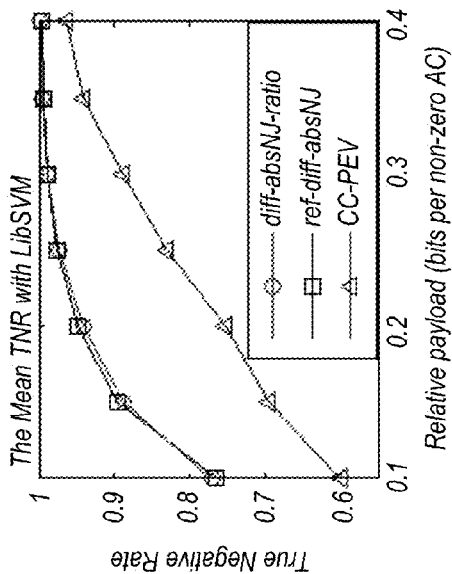
FIG. 4Y-C
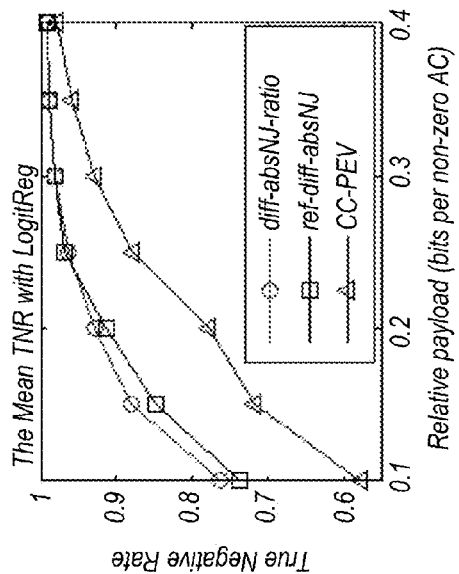
FIG. 4Y-D

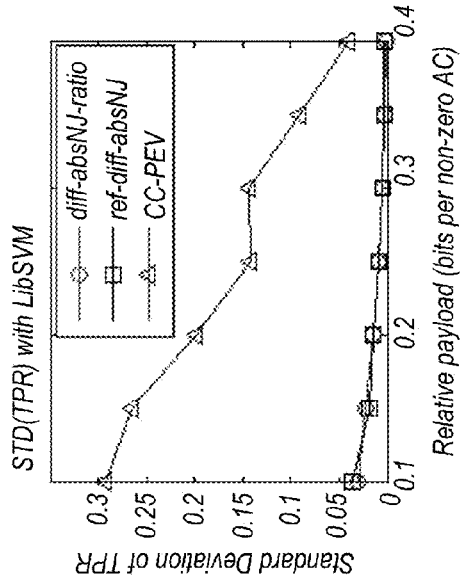
FIG. 4Y-F
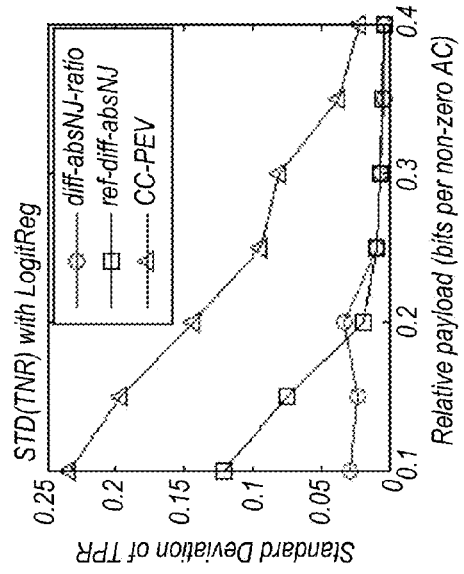
FIG. 4Y-H
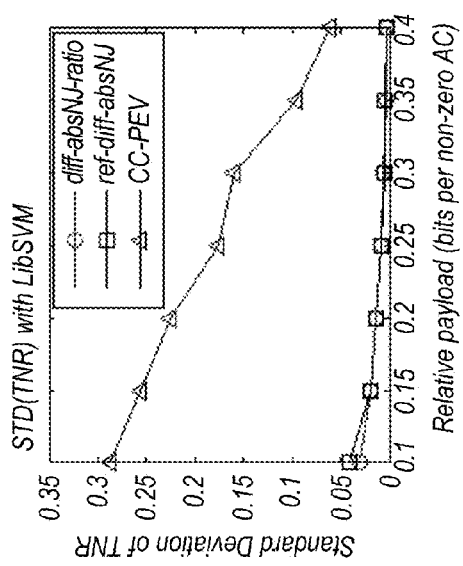
FIG. 4Y-E
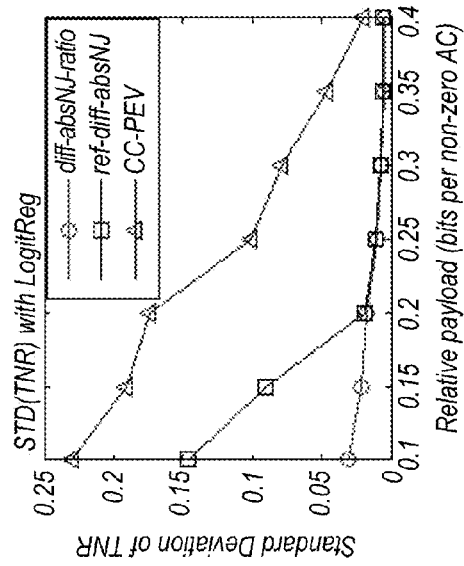
FIG. 4Y-G

STEGANALYSIS WITH NEIGHBORING JOINT DENSITY

PRIORITY CLAIM

This application claims the benefit of U.S. Provisional Application No. 61/593,752 filed on Feb. 1, 2012.

STATEMENT REGARDING FEDERALLY SPONSORED RESEARCH OR DEVELOPMENT

This invention was made with government support under award no. 2010-DN-BX-K223 awarded by the National Institute of Justice, Office of Justice Programs, U.S. Department of Justice. The government has certain rights in the invention.

BACKGROUND

1. Field

The present disclosure relates generally to methods for detecting hidden messages. More particularly, aspects of the present disclosure relate to systems and methods for steganalysis to detect hidden messages in digital files.

2. Description of the Related Art

Steganography is the art and science to carry messages in covert channels, aiming to enable secretive communication by embedding data into digital files without any attention to the existence of the hidden message. The potential of exploiting steganography for covert dissemination is great: for example, a recent espionage issue reveals that steganography has been employed by a governmental intelligent agency. For several purposes, it is a heightened need to realize effective countermeasures for steganography. Steganalysis generally employs techniques of signal processing, feature mining and pattern recognition and aims at detecting the existence of hidden messages.

In steganography, digital images may be easily manipulated to carry hidden messages. Examples of steganographic algorithms/systems include LSB embedding, LSB matching, spread spectrum steganography, Outguess, F5, model-based steganography, Steghide, BCH syndrome code based less detectable JPEG steganography, and highly undetectable steganography (HUGO).

Recent advances in steganography, such as adaptive steganography in DCT domain with optimized costs to achieve the minimal-distortion, have posed serious challenges to steganalyzers. Well-designed steganographic systems, such as Gibbs construction-based steganography, Syndrome-Trellis Codes based steganography, have posed additional challenges for steganalysis. In addition, Filler and Fridrich have proposed a practical framework of adaptive steganographic systems by optimizing the parameters of additive distortion functions and minimizing the distortion for ±1 embedding in the DCT domain, which has further advanced hiding data in wide-spread JPEG images.

Yet Another Steganographic Scheme ("YASS") was designed to be a secure JPEG steganographic algorithm with randomized embedding. Some methods have been developed for steganalysis of YASS systems. The detection of the YASS steganograms produced by a large B-block parameter, however, has not been well explored.

SUMMARY

Systems and methods for detecting hidden messages and information in digital files are described. In an embodiment, a method of detecting steganography in a compressed digital image, such as a JPEG image, includes extracting neighboring joint density features from the image under scrutiny. The image is decoded to a spatial domain. The image is cropped and the cropped image is encoded. Neighboring joint density features are extracted from the encoded cropped image. Steganography in the image may be detected based on differences in a neighboring joint density feature of the image and a neighboring joint density feature of the encoded cropped image.

In an embodiment, a method of detecting YASS steganography in a compressed digital image includes decoding an image under scrutiny to a spatial domain. The decoded image is divided into blocks. Blocks possibly used for information hiding are searched. An absolute DCT coefficient array is determined for the candidate blocks for information hiding. Neighboring joint density features are extracted from the absolute DCT coefficient array and for non-candidate neighboring blocks. Steganography in the image may be detected based on differences between values of neighboring joint density for candidates and non-candidate neighbors.

In an embodiment, a method detecting hidden material in a compressed digital image includes determining values associated with neighboring joint density for a first image and determining values associated with neighboring joint density for a second image related to the first image. Steganography is detected in the image based on differences between values associated with neighboring joint density of the first image and values associated with neighboring joint density feature of the second image.

BRIEF DESCRIPTION OF THE DRAWINGS

FIG. 4y illustrates mean and standard deviation of true negative rate (TNR) and true positive rate (TPR) by applying LibSVM and logistic regression.

Figure 1A:
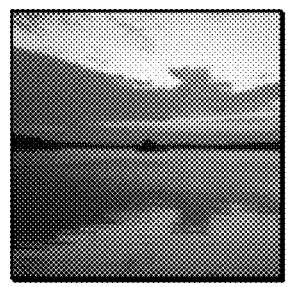
FIGS. 1a through d illustrate an example of modification of neighboring joint density features by DCT-embedding-based adaptive steganography.
Figure 1B:
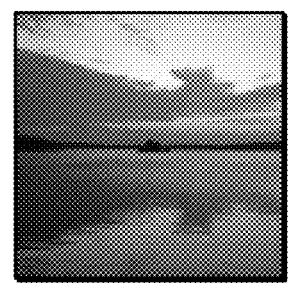

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In various embodiments, a calibrated neighboring joint density-based approach is used to detect DCT-embedding based adaptive and non-adaptive steganographic systems. In some embodiments, a self-calibration for JPEG steganalysis is used to detect DCT-embedding-based adaptive steganography with a calibrated neighboring joint density-based approach to steganalysis of JPEG images. In some embodiments, steganalysis of JPEG images is used to perform digital forensics.

In some embodiments of a system to detect the DCT-embedding based adaptive steganography, the neighboring joint density on the absolute array of DCT coefficients is extracted from a JPEG image under examination. A calibrated algorithm is used to extract the reference features. The differential features between the original neighboring joint density and the reference are calculated. Support Vector Machines (SVM) and logistic regression classifiers may be used for detection.

In some embodiments, a steganalysis method and methodology of self-calibration for JPEG steganalysis, a calibrated neighboring joint density-based approach to perform steganalysis of YASS in JPEG images. In some embodiments, to discriminate YASS steganograms from covers, the candidate blocks that are possibly used for embedding and the non-candidate block neighbors that are impossibly used for information hiding are identified first. The difference of the neighboring joint density between candidate blocks and the non-candidate blocks is obtained. Support Vector Machine, Fisher's linear classifier, and logistic regression classifier may be employed for detection. In some embodiments, steganalysis of YASS, used in the detection of the YASS steganograms that are produced with a large B-block size. In one embodiment, the detection performance on the YASS steganograms with large parameter of B-block size (for example, 12, 13, 14, and 15).

Examples of Steganography Systems

DCT-Embedding-Based Adaptive Steganography

Most steganographic systems aim to minimize the distortion of original cover, although the distortion is unperceivable to human eyes. A framework may be selected to minimize statistical detectability. To realize DCT-embedding-based adaptive steganography, an inter/intra-block cost model may be given, as well as the performance of embedding algorithms based on the inter/intra-block cost model. An example framework is given below:

Minimal-distortion steganography can be implemented by minimizing the following cost function:

$$D(x, y) = \sum_{i=1}^{n} \rho_i(x, y_i) \quad (1)$$

where $\rho_i(x, y_i) \in \Re$ is the cost of changing the $i^{th}$ cover pixel $x_i$ to $y_i$.

To design DCT-embedding based adaptive steganography, an inter/intra-block cost model has been defined by Filler and Fridrich.

Let $\theta = (\theta_{ir}, \theta_{ia}) \in \Re^{(2\Delta+1)+1} \times \Re^{(2\Delta+1)+1}$ be the model parameters describing the cost of disturbing inter- and intra-block dependencies with $\theta_{ir} = (\theta_{ir,-\Delta}, \ldots, \theta_{ir,\Delta}, \theta_{ir,\cdot})$ and $\theta_{ia} = (\theta_{ia,-\Delta}, \ldots, \theta_{ia,\Delta}, \theta_{ia,\cdot})$.

The cost of changing any AC DCT coefficients $x_{ij}$ to $y\gamma = I_{ij}I_{ij} = \{x_{ij}-1, x_{ij}, x_{ij}+1\} \cap I$ is given by:

$$\rho_{ij}(x, y) = \Theta(y) = \begin{cases} 0 & \text{if } y = x_{ij} \\ \infty & \text{if } y \notin I_{ij} \\ \sum_{z \in N_{ia}} \theta_{ia,x_{ij}-z}^2 + \sum_{z \in N_{ir}} \theta_{ir,x_{ij}-z}^2 & \text{otherwise} \end{cases} \quad (2)$$

Where $N_{ia}$ and $N_{ir}$ are intra- and inter-block neighborhoods. Based on the inter/intra-block cost model, while the embedding algorithms are optimized by using the multi-layered Syndrome-Trellis Codes to minimize the L2R_L2LOSS criterion, with SVM and CC-PEV feature set, and Cross-Domain Feature set, respectively, DCT-embedding-based adaptive steganography may improve DCT-embedding-based steganography.

YASS

One example of a YASS algorithm includes the following steps:

1) Repeat-Accumulate error correction code is used to encode the payload;
2) The cover image is divided into big blocks of T×T (T=9, 10, ..., 15), denoted by B-block;
3) In each B-block, an 8×8 block is randomly selected for payload embedding;
4) The embedding includes the following operations:
   a) Selected 8×8 block is transformed using a two-dimensional DCT;
   b) The DCT coefficients are divided by a quantization table, corresponding to the hiding quality factor QFh;
   c) To enhance the robustness of the embedded data, binary hidden bits may be embedded into the 19 low-frequency AC DCT coefficients whose values are non-zeros, by employing Quantization Index Modulation (QIM) strategy;
   d) The modified 8×8 block is transformed back to spatial domain;
5) The modified image is encoded in JPEG format with the advertising quality factor QFa.

Although YASS embedding is not confined to the 8×8 block of the final JPEG compression, the location of embedding block in B-block may not be random enough. By using QIM-based embedding, YASS may also introduce additional zero DCT coefficients in the modified 8×8 block. The following algorithm may break YASS.

Algorithms used in some embodiments may be as described in further detail in Liu Q, Sung AH and Qiao M (2011), A method to detect JPEG-based double compression, In Proc. Of 8$^{th}$ International Symposium on Neural Networks (2), pages 466-476, and Li B, hi Y, and Huang J. (2009). Steganalysis of YASS. IEEE Trans. Information Forensics and Security, 4(3):369-382, both of which are incorporated by reference as if fully set forth herein.

In some embodiments, a JPEG image under examination may be transformed to spatial domain, denoted by $I_1$;
For T=9 to 15
For s=1 to T
(a) Divide $I_s$ into non-overlapping consecutive T×T B-blocks;
(b) Collect 8×8 blocks from the upper left of all B-blocks and perform 2D DCT;
(c) Quantize the DCT coefficients by using $QF_a$;
(d) Compute the probability of zero rounded re-quantized DCT coefficients in candidate embedding bands and denote it by $Z_T(s)$;
(e) Crop the first s columns and the first s rows of I1 to generate a new image $I_{s+1}$ for the next inner-loop;
Compute the values of:

$$\frac{1}{T-7}\sum_{i=1}^{T-7} Z_T(i) \text{ and } \frac{1}{7}\sum_{j=T-6}^{T} Z_T(j)$$

as features.
End

As shown by the above algorithm, the features may be extracted from the candidate blocks along the diagonal direction of B-blocks, not from all possible 8×8 candidate blocks in B-blocks. In a B-block with the size of T×T, there are total of (T−7)×(T−7) block candidates for embedding. The above algorithm may only select the (T−7) blocks along diagonal direction, not all candidate blocks. As a result, the chance of the candidates along diagonal direction only hits 1/(T−7). While the value of T is large, the hit ratio may be relatively low. For instance, T=15, the hit ratio may be only ⅛=0.125. Detection accuracy may be lower with a large T value.

Neighboring Joint Density-Based JPEG Steganalysis

In some embodiments, features are designed in the format of statistical correlation on neighboring joint density, a neighboring joint-density and expanded Markov-based approach is used to perform steganalysis of JPEG images. Some approaches to steganalysis may be applied to digital video and audio streams.

In many cases, neighboring joint density of DCT coefficients is symmetric about the origin. The neighboring joint density features may be designed on the absolute array of DCT coefficients, described as follows.

1). Neighboring Joint Density on Intra-Block
Let F denote the quantized DCT coefficient array consisting of M×N blocks $F_{ij}$ (i=1, 2, ..., M; j=1, 2, ..., N).

The intrablock neighboring joint density matrix on horizontal direction $absNJ_{1h}$ and the matrix on vertical direction $absNJ_{1v}$ are given by:

$$absNJ_{ih}(x, y) = \frac{\sum_{i=1}^{M}\sum_{j=1}^{N}\sum_{m=1}^{8}\sum_{n=1}^{7}\delta(|c_{ijmn}| = x, |c_{ijm(n+1)}| = y)}{56MN} \quad (3)$$

$$absNJ_{iv}(x, y) = \frac{\sum_{i=1}^{M}\sum_{j=1}^{N}\sum_{m=1}^{7}\sum_{n=1}^{8}\delta(|c_{ijmn}| = x, |c_{ijm(m+1)n}| = y)}{56MN} \quad (4)$$

Where $c_{ijmn}$ is the DCT coefficient located at the m$^{th}$ row and the n$^{th}$ column in the block $F_{ij}$, θ=1 if its arguments are satisfied, otherwise θ=0; x and y are integers. For computational efficiency, we define $absNJ_1$ as the neighboring joint density features on intra-block, calculated as follows:

$$absNJ_1(x,y)=\{absNJ_{1h}(x,y)+absNJ_{1v}(x,y)\}/2 \quad (5)$$

In some embodiments, values of x and y may be in the range [0, 5], and $absN_{J1}$ may include 36 features.

2). Neighboring Joint Density on Inter-Block
The inter-block neighboring joint density matrix on horizontal direction $absNJ_{2h}$ and the matrix on vertical direction $absNJ_{2v}$ may be constructed as follows:

$$absNJ_{2h}(x, y) = \frac{\sum_{m=1}^{8}\sum_{n=1}^{8}\sum_{i=1}^{M}\sum_{j=1}^{N-1}\delta(|c_{ijmn}| = x, |c_{i(j+1)mn}| = y)}{64M(N-1)} \quad (6)$$

$$absNJ_{2v}(x, y) = \frac{\sum_{m=1}^{8}\sum_{n=1}^{8}\sum_{i=1}^{M-1}\sum_{j=1}^{N}\delta(|c_{ijmn}| = x, |c_{(i+1)jmn}| = y)}{64(M-1)N} \quad (7)$$

We define absNJ2 as the neighboring joint density features on inter-block, calculated as follows:

$$absNJ_2(x,y)=\{absNJ_{2h}(x,y)+absNJ_{2v}(x,y)\}/2 \quad (8)$$

Similarly, the values of x and y are in [0, 5] and absNJ2 has 36 features. In some embodiments, the neighboring joint density features defined, for example, by equations (5) and (8) are denoted by absNJ, which may include, in one example, 72 features.

Additional examples of steganalysis are described in Liu, Q., Sung, A H, and Qiao, M (2011). Neighboring Joint Density-Based JPEG Steganalysis, ACM Transactions on Intelligent Systems and Technology, Vol. 2, No. 2, Article 16, which is incorporated by reference as if fully set forth herein.

Calibrated Neighboring Joint Density to Detect DCT-Embedding Steganography.

DCT-embedding-based adaptive steganography aims to minimize the distortion cost through Syndrome-Trellis Codes. Although the modification is very small, however, DCT-embedding-based adaptive steganography does modify the neighboring joint density features. FIGS. 1a through d illustrate one example of modification of neighboring joint density features by DCT-embedding-based adaptive steganography.

Figure 1C:
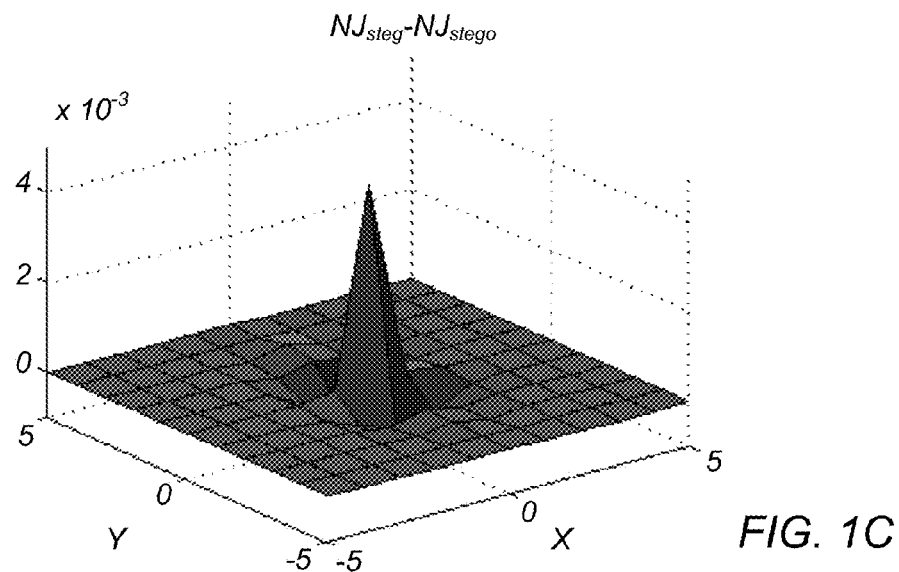
Figure 1D:
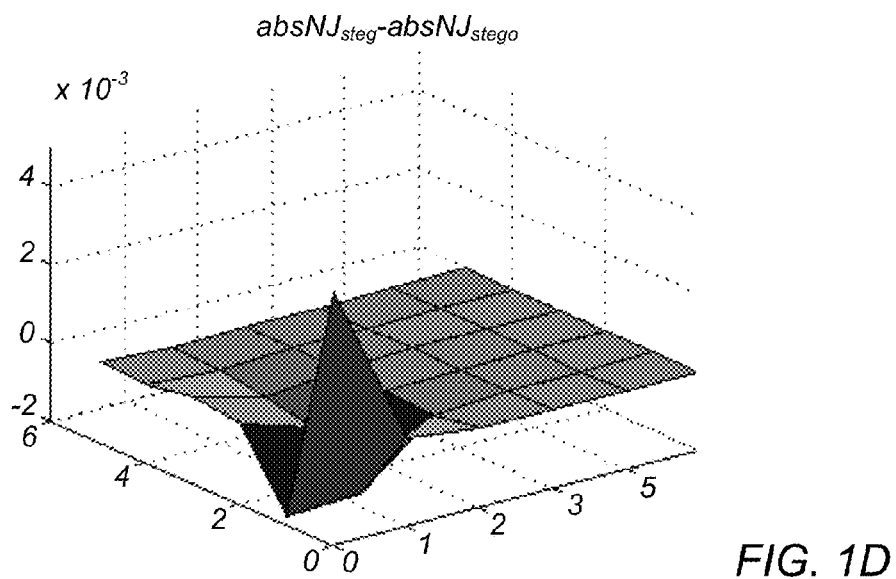

FIGS. 1(a) and (b) show a JPEG cover and the JPEG steganogram produced by using DCT-embedding-based adaptive hiding algorithm with the relative payload of 0.4 bits per non-zero-AC (bpac). FIG. 1(c) shows the difference of the intra-block based neighboring joint density extracted from FIG. 1(a) and FIG. 1(b). FIG. 1(d) shows the difference of the neighboring joint density on the absolute array of DCT coefficients, as may be defined, for example, by equation (5).

In an embodiment, to capture the modification of the density caused by the embedding, following the strategy of self-calibration, a calibration on neighboring joint density may be designed, described as follows:

1. The neighboring joint density features absNJ1(x,y) and absNJ2(x,y), defined by equations (5) and (8), are extracted from a JPEG image under examination;

2. The testing JPEG image is decoded in spatial domain, and cropped by i rows and j columns ($0 \leq i < 7$, $0 \leq j < 7$, and i+j>0). The cropped image is encoded in JPEG format with the same quantization matrix, and the joint density features, denoted by $absNJ_{1_{i,j}}^c(x, y)$ and $absNJ_{2_{i,j}}^c(x, y)$ are extracted from the cropped JPEG images, here $(i,j) \in \{(0,1),(0,2),\ldots,(1,0),(1,1),\ldots,(7,7)\}$;

3. The mean values of $absNJ_1^c$ and $absNJ_2^c$ are calculated by $$\overline{absNJ_1^c}(x, y) = \frac{1}{63}\sum_{(i,j)} absNJ_{1_{i,j}}^c(x, y) \quad (9)$$

$$\overline{absNJ_2^c}(x, y) = \frac{1}{63}\sum_{(i,j)} absNJ_{2_{i,j}}^c(x, y) \quad (10)$$

4. The differential joint density features are given by $$absNJ_1^D(x,y) = absNJ_1(x,y) - \overline{absNJ_1^c(x,y)} \quad (11)$$

$$absNJ_2^D(x,y) = absNJ_2(x,y) - \overline{absNJ_2^c(x,y)} \quad (12)$$

5. The differential ratio features are obtained by $$R_{absNJ_1}(x, y) = absNJ_1^D(x, y) / \overline{absNJ_1^C}(x, y) \quad (13)$$

$$R_{absNJ_2}(x, y) = absNJ_2^D(x, y) / \overline{absNJ_2^C}(x, y) \quad (14)$$

The differential neighboring joint density features, defined in equations (11) and (12), and original neighboring joint density features, defined, for example, in equations (5) and (8), are denoted by DC-absNJ (Differential Cropping-based absNJ feature set), which may include 144 features. The calibrated neighboring joint density features, defined by equations (9) and (10), and original features defined, for example, by equations (5) and (8), are integrated as CC-absNJ (Calibration-Cropping-based absNJ feature set, also called Cartesian calibration-based absNJ. Additionally, to examine different calibrations, 63-cropping-based calibration and rescaling-based calibration may be compared. An example of rescaling-based calibration may be as follows: The image under examination is first up scaled in the spatial domain and compressed in order to remove the impact of information hiding, then down scaled back to the original image size in spatial domain, and compressed with the quantization table that is the same to the original JPEG image under examination. The neighboring joint density features defined, for example, by equation (5) and (8), extracted from original image are denoted by $absNJ_1(x,y)$ and $absNJ_2(x,y)$, extracted from processed image may be denoted by $absNJ_1 s(x,y)$, and $absNJ_2 s(x,y)$. The Differential Scaling-based absNJ feature set (DS-absNJ), including $absNJ_1$, $absNJ_2$, $absNJ_1$-absNJ1s, and $absNJ_2$-absNJ2s. The Calibration-Scaling-based absNJ feature set (CS-absNJ), including absNJ1, absNJ2, absNJ1s, and absNJ2s.

Neighboring Joint Density-Based YASS-Detection Algorithm

In an embodiment, by searching all possible 8×8 candidate blocks in B-blocks, the neighboring joint density of the DCT coefficients may be extracted from all candidate blocks and the 8×8 block neighbors that impossibly belong to the candidate set for information hiding. The difference of the joint density values of the candidates and the non-candidate neighbors may be calculated. One algorithm of a design to detect YASS steganogram may be as follows:

1. Decode an input JPEG image under scrutiny to spatial domain, and divide it into non-overlapping consecutive T×T B-blocks (T=9, 10, ... , 15);

2. In each T'T B-block, search all 8×8 blocks possibly used for information hiding, total (T−7)2 candidate blocks. The set of all candidate blocks of the image under detection is denoted by C. For each candidate block C(i) (i=1, 2, cn), subtract 128 from each pixel value, then apply two-dimensional DCT transform, quantize the DCT coefficients by using the quantization matrix corresponding to QFa and obtain the absolute DCT coefficient array. The neighboring joint density features, (defined by, for example, by equation (5)), may be extracted from the absolute DCT coefficient array, denoted by absNJ(i; x,y).

3. From all adjacent 8×8 blocks to the candidate block C(i) in the horizontal or vertical direction but without any overlapping to C(i), denoted by N(i), the adjacent 8×8 blocks that do not belong to C may be identified. The non-candidate block neighbors may be denoted by NC(i). The neighboring joint density (defined, for example, by equation (5)) may be extracted from these non-candidate neighboring blocks. The average neighboring joint density may be denoted by avg_absNJ(i; x, y). The difference of the joint density from the candidate block C(i) and the average neighboring joint density may be given by $$\text{diff\_absNJ}(i;x,y) = absNJ(i;x,y) - \text{avg\_absNJ}(i;x,y) \quad (13)$$

4. The total number of candidate blocks is cn. The mean values of the differential joint density, which may be the features for YASS steganalysis in this example, may be given by the following:

$$\text{diff\_absNJ}(x,y) = \Sigma_i \text{diff\_absNJ}(x,y)/cn \quad (14)$$

Figure 2A:
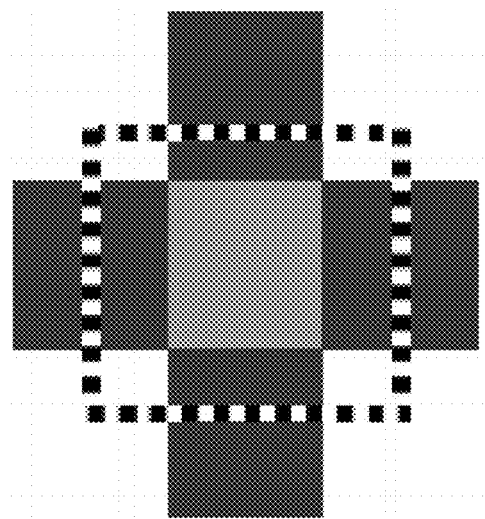
FIG. 2a through 2c illustrate a candidate block located in a B-block and the non-candidate neighbors across two B-blocks.
Figure 2B:
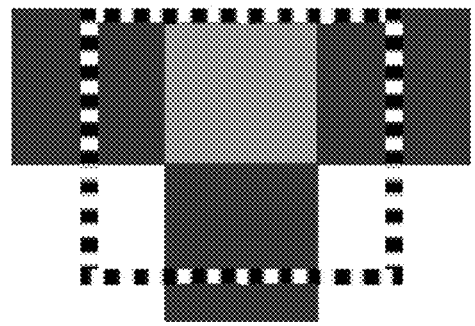
Figure 2C:
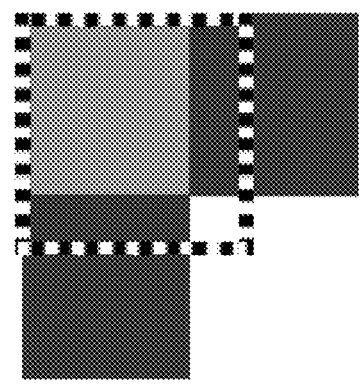
Figure 3:
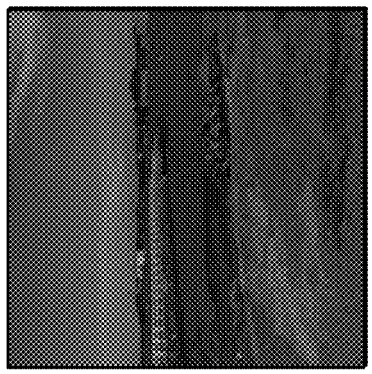
FIG. 3 illustrates comparisons of neighboring density features from the YASS steganograms and features of covers.
Figure 3:
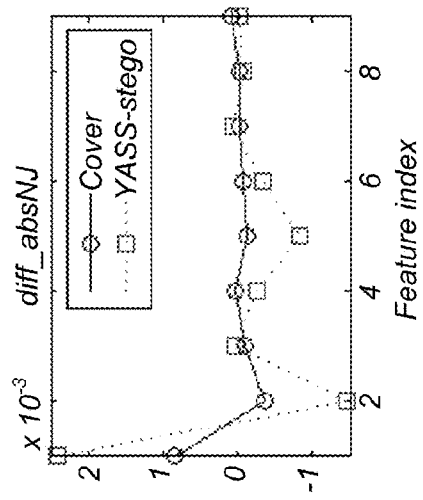
Figure 3:
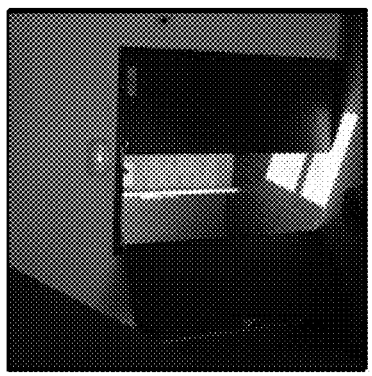
Figure 3:
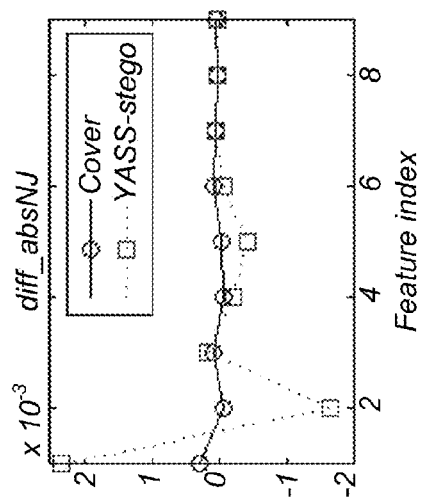
Figure 3:
Figure 3:
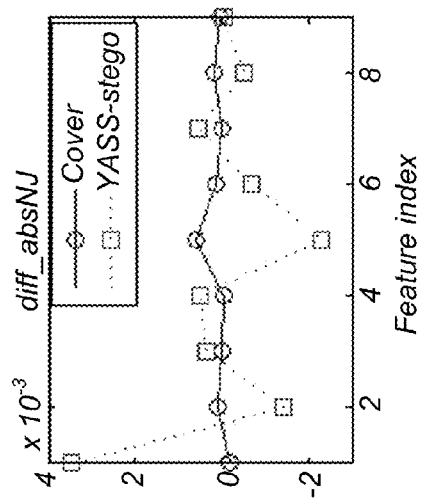

In a T×T B-block, which is not on the boundary of the image under examination, if an 8×8 block candidate is located:

(a) inside of the B-block, it has four non-candidate neighbors, shown by FIG. 2(a);

(b) on one of the four boundary borders of the B-block but not on any corner, it has three non-candidate neighbors, shown by FIG. 2(b);

(c) on one of the four corners of the B-block, it has two non-candidate neighbors, shown by FIG. 2(c)

FIGS. 2 (a), (b), and (c) illustrate the above scenarios. The square in dash stands for a B-block, a complete block in the B-block represents a candidate block for possible hiding and the non-candidate block neighbors are across the square. In this example of YASS detection, the values of x and y may be set in [0, 2] and diff_absNJ may include 9 features, corresponding to each value of T. The diff_absNJ features extracted from covers may be approximately zero-valued, but the values of the features from YASS steganograms are not constrained to zeros.

EXAMPLES

Example 1

Steganalysis of DCT-Embedding-Based Non-Adaptive and Adaptive Steganography 1) Setup 5000 original color TIFF raw format digital images used in the experiments are 24-bit, 640×480 pixels, lossless true color and never compressed. The original images are cropped into 256×256 pixels in order to eliminate the low complexity parts and converted the cropped images into JPEG format with the default quality. The following DCT-embedding-based non-adaptive steganograms may be generated with different hiding ratios. In this example, the information-hiding ratio is measured by using the relative payload, calculated by the ratio of the number of the DCT-coefficients modified to the total number of non-zero valued AC DCT-coefficients.

1. JPHS (JPHIDE and JPSEEK).
2. Steghide. Hetzl and Mutzel designed a graph-theoretic approach for information-hiding based on the idea of exchanging rather than overwriting pixels. This approach preserves first-order statistics.
3. F5. The algorithm F5 may withstand visual and statistical attacks, yet it still offers a large steganographic capacity.
4. Model Based steganography without deblocking (MB1) and with deblocking (MB2).
5. DCT-embedding-based adaptive steganography. To produce DCT-embedding-based adaptive steganography, 1000 BOSSRank cover images downloaded from [3] are first converted into JPEG images with the quality factor "75". The JPEG-based adaptive steganograms are produced by using an adaptive DCT-embedding hiding tool, and the parameter of hiding bits per non-zero-AC (bpac) is set from 0.1 to 0.35 with the step size of 0.05 bpac.

A 72-dimensional feature set, absNJ, defined, for example, by equations (5) and (8), 144-dimensional feature set, DC-absNJ, defined, for example, by equations (5), (8), (11), and (12), 548-dimensional CC-PEV, PEV, and 486-dimensional Markov feature set are compared. Table I lists these feature sets based on a comparison study.

TABLE I

The steganalysis algorithms/feature sets compared in our study

| Feature set | Feature dimensionality | Source |
|---|---|---|
| DC-absNJ | 144 | Eqs.(5), (8), (11), (12) |
| absNJ | 72 | [41] |
| CC-PEV | 548 | [26] |
| PEV | 274 | [52] |
| Markov | 486 | [6] |

In various embodiments, a logistic regression (LR) classifier, Fisher's Linear Discriminant (FLD) by minimizing the errors in the least square sense, or Support Vector Machines (SVM) [60], learning classifiers may be used in steganalysis. In one study, to select SVM, algorithms were compared with LibSVM, SVM_light, the SVM algorithms implemented in PRtools, and five SVM learning algorithms in LIBLINEAR. These SVM algorithms were compared with different parameters including linear, polynomial, and radial basis function (RBF) kernels. Although the algorithms implemented in LIBLINEAR package are the fastest, the detection performances may not be a good. Although the computational cost may be the highest, LibSVM generally obtains the best detection accuracy. LibSVM with optimal kernel parameters after grid search may be employed to compare different combinations of kernel parameters. In one experiment, the logistic regression classifier in PRtools was employed.

One hundred experiments were conducted for each feature set at each hiding ratio by using each classifier. In each experiment, 70% samples are randomly selected for training, and the other 30% samples are used for testing; the image data for training are the same for each feature set and the images for testing are the same for each feature set. The prediction outcomes on testing data can be divided into True Negative (TN), False Negative (FN), False Positive (FP), and True Positive (TP). Detection accuracy is calculated by 0.5*TN/(TN+FP)+ 0.5*TP/(TP+FN). In addition to detection accuracy, the detection performance may be compared using Matthews's correlation coefficient (MCC), which is a measure of the quality of binary classifications and in essence a correlation coefficient between the observed and predicted binary classifications with the value between −1 and +1. A coefficient of +1 represents a perfect prediction, 0 a random guess, and −1 an inverse prediction. The MCC can be calculated using the formula:

$$MCC = \frac{TP \times TN - FP \times FN}{\sqrt{(TP+FP)(TP+FN)(TN+FP)(TN+FN)}} \quad (15)$$

The area under the receiver operating characteristic (ROC) curve (AUC) may also be used as a measure of classification performance. The measure may be aggregated over decision threshold as well as class and cost skews. While the classification is perfect, the value of AUC is 1. The AUC-error is calculated by one minus AUC. The range of AUC-error is normally between 0 and around 0.5; the smaller AUC-error value indicates the better classification performance. The AUC-error value of 0 means perfect classification and 0.5 a random guess. In each experiment, we also examine the prediction outcome under different decision thresholds, obtain the ROC curve, and calculate the AUC-error.

2) Experimental Results

Tables II, III and IV list the mean values of detection accuracy, mean values of MCC value, and mean values of AUC-error over 100 experiments respectively. The mean value may indicate a better classification performance between linear kernel and RBF kernel is given under SVM. Spanning over the three types of learning classifiers and the five feature sets, the top type for this particular example is highlighted in bold. In this example, the experimental results show that the DC-absNJ generally outperformed absNJ, CC-PEV, PEV, and Markov-based feature sets. For example, DC-absNJ may improve the detection accuracy by about 3%, 4%, 8%, and 15% respectively when detecting F5 steganograms with the relative payload of 0.051 bpac, and improves the detection accuracy by about 7%, 11%, 12%, and 24% respectively when detecting DCT-embedding-based adaptive steganography at 0.1 bpac. In our experiments, the computational cost with FLD or with LR may be much lower than the cost using SVM; the detection performance with LR may not always be promising and stable. The mean values underperformed with the use of LR are listed in italic. The experimental results in Tables II, III, and IV also show that the security level of DCT-embedding-based adaptive steganography may be higher than other compared steganographic systems. For example, while the relative payload may be about 0.1 bpac, the best average detection accuracy is less than 80% when detecting the adaptive steganography but all detection accuracy values are higher than 90% (some close to 100%) when detecting the non-adaptive steganographic systems.

TABLE II

The mean detection accuracy (%) over 100 experiments with SVM (LibSVM),
Fisher Linear Discriminant (FLD), and LogitReg (LR) classifier

| Hiding algorithm | Relative Payload | DC-absNJ SVM | DC-absNJ FLD | DC-absNJ LR | absNJ SVM | absNJ FLD | absNJ LR | CC-PEV SVM | CC-PEV FLD | CC-PEV LR | PEV SVM | PEV FLD | PEV LR | Markov SVM | Markov FLD | Markov LR |
|---|---|---|---|---|---|---|---|---|---|---|---|---|---|---|---|---|
| F5 | 0.051 | 94.4 | 94.6 | 94.3 | 91.9 | 91.0 | 91.8 | 81.0 | 90.4 | *62.5* | 85.6 | 86.4 | 84.6 | 68.1 | 75.7 | 80.0 |
|  | 0.077 | 96.6 | 95.4 | 96.0 | 93.9 | 91.1 | 93.8 | 85.3 | 92.0 | *69.4* | 90.0 | 88.6 | 82.2 | 66.9 | 76.6 | 78.6 |
|  | 0.105 | 98.4 | 97.1 | 97.3 | 96.5 | 92.9 | 96.2 | 91.7 | 96.5 | 94.9 | 94.5 | 94.3 | *78.6* | 75.5 | 85.2 | 87.4 |
|  | 0.137 | 99.0 | 98.2 | 98.1 | 97.6 | 94.7 | 97.3 | 94.0 | 97.7 | 96.8 | 96.5 | 96.6 | 90.2 | 76.6 | 91.6 | *69.5* |
|  | 0.185 | 99.3 | 98.9 | 98.8 | 97.9 | 95.8 | *81.3* | 97.3 | 99.3 | 98.4 | 97.9 | 98.9 | 94.4 | 86.9 | 96.5 | 94.9 |
|  | 0.282 | 99.9 | 99.6 | 99.6 | 99.2 | 98.7 | *63.9* | 98.9 | 99.6 | 99.2 | 99.1 | 99.5 | 98.6 | 95.0 | 97.7 | 96.5 |
|  | 0.354 | 100.0 | 99.6 | 100.0 | 99.8 | 99.7 | 99.6 | 99.8 | 99.8 | 99.9 | 99.8 | 99.8 | 99.9 | 97.7 | 99.4 | 99.1 |
| JPHS | 0.023 | 66.7 | 62.5 | 66.0 | 66.2 | 61.8 | 66.4 | 64.6 | 67.7 | 63.6 | 64.2 | 65.7 | 64.8 | 61.7 | 55.9 | 56.4 |
|  | 0.033 | 67.4 | 66.1 | 69.4 | 64.6 | 62.8 | 66.6 | 66.8 | 66.8 | *57.5* | 62.6 | 61.4 | 62.7 | 50.7 | 52.1 | 54.3 |
|  | 0.042 | 76.9 | 75.7 | 77.8 | 73.2 | 71.6 | 74.7 | 73.6 | 75.4 | *56.4* | 69.3 | 67.2 | 65.3 | 54.6 | 55.1 | 61.7 |
|  | 0.053 | 83.2 | 80.3 | 83.6 | 79.9 | 76.0 | 80.7 | 78.3 | 81.9 | *54.8* | 76.2 | 73.3 | 70.5 | 58.6 | 61.3 | 70.3 |
|  | 0.068 | 85.2 | 81.5 | 85.8 | 77.6 | 72.7 | 78.9 | 83.8 | 85.0 | *53.7* | 80.1 | 76.9 | 71.9 | 61.1 | 61.4 | 69.1 |
|  | 0.097 | 91.7 | 89.8 | 92.2 | 83.4 | 79.4 | 85.8 | 91.1 | 93.1 | 88.7 | 89.1 | 86.7 | 82.6 | 67.4 | 74.5 | 79.1 |
|  | 0.230 | 97.7 | 97.0 | 97.3 | 93.5 | 91.9 | 94.4 | 97.3 | 98.0 | 97.3 | 96.8 | 95.8 | 93.0 | 88.5 | 88.8 | 91.8 |
| Steghide | 0.021 | 92.1 | 92.5 | 91.9 | 88.9 | 88.1 | 89.5 | 82.4 | 89.5 | *63.9* | 82.4 | 82.6 | 76.1 | 72.9 | 83.3 | 83.5 |
|  | 0.029 | 95.3 | 95.9 | 95.3 | 92.0 | 91.0 | 92.3 | 83.9 | 93.0 | *69.9* | 85.5 | 85.7 | *76.6* | 75.0 | 85.9 | 87.3 |
|  | 0.036 | 98.0 | 97.4 | 97.6 | 95.0 | 93.4 | 95.1 | 90.1 | 96.8 | 94.3 | 90.5 | 92.1 | *76.1* | 84.1 | 91.7 | 90.8 |
|  | 0.044 | 99.1 | 98.3 | 99.0 | 97.3 | 95.5 | 97.0 | 94.2 | 98.7 | 95.3 | 96.4 | *77.1* | 89.6 | 96.0 | 95.6 |  |
|  | 0.055 | 99.7 | 99.2 | 99.5 | 98.1 | 96.3 | 98.1 | 96.7 | 99.3 | 98.4 | 97.5 | 97.9 | 95.4 | 93.7 | 97.4 | 96.6 |
|  | 0.073 | 100.0 | 99.7 | 99.8 | 99.4 | 98.1 | 99.2 | 99.1 | 99.7 | 99.5 | 99.3 | 99.5 | 98.2 | 97.9 | 99.0 | 98.9 |
|  | 0.114 | 100 | 99.9 | 99.9 | 99.8 | 99.3 | 99.8 | 99.7 | 99.8 | 99.7 | 99.7 | 99.7 | 96.1 | 99.2 | 99.4 | 99.6 |
| MB1 | 0.073 | 99.5 | 98.1 | *83.3* | 95.8 | 94.8 | 96.2 | 93.9 | 96.1 | 94.6 | 94.2 | 92.2 | *68.9* | 90.8 | 92.0 | 91.2 |
|  | 0.089 | 99.9 | 99.7 | 99.9 | 97.4 | 95.3 | 97.4 | 95.5 | 98.5 | 96.6 | 96.0 | 95.6 | *78.3* | 90.5 | 94.5 | 93.7 |
|  | 0.094 | 99.7 | 99.5 | 99.5 | 97.9 | 96.5 | 97.6 | 95.5 | 98.4 | 97.4 | 95.6 | 95.1 | *79.5* | 92.2 | 95.0 | 94.7 |
|  | 0.125 | 99.9 | 98.6 | 99.4 | 98.4 | 94.6 | 98.0 | 96.1 | 97.5 | 96.9 | 95.5 | 93.8 | 93.7 | 90.3 | 93.4 | 94.0 |
|  | 0.172 | 99.9 | 99.7 | 99.9 | 99.8 | 98.9 | 99.8 | 98.9 | 99.6 | 99.3 | 99.6 | 99.3 | 97.8 | 99.1 | 99.3 | 99.2 |
|  | 0.183 | 100.0 | 99.8 | 100.0 | 99.8 | 99.5 | 99.9 | 99.5 | 99.8 | 99.7 | 99.7 | 99.4 | 97.0 | 99.3 | 99.3 | 99.4 |
|  | 0.195 | 100.0 | 99.9 | 100.0 | 99.9 | 99.4 | 100.0 | 98.9 | 99.9 | 99.8 | 99.8 | 99.3 | 98.6 | 97.8 | 99.4 | 99.4 |
| MB2 | 0.101 | 98.5 | 96.4 | *60.1* | 96.6 | 92.2 | 96.9 | 95.0 | 96.7 | 96.3 | 94.0 | 92.3 | *72.8* | 90.7 | 92.0 | 92.4 |
|  | 0.120 | 99.3 | 98.4 | 98.7 | 98.0 | 95.9 | 96.5 | 95.5 | 98.9 | 98.3 | 96.2 | 95.8 | *82.2* | 87.2 | 94.7 | 94.6 |
|  | 0.131 | 99.7 | 99.1 | 99.3 | 99.0 | 97.4 | 98.6 | 97.0 | 99.3 | 98.0 | 97.8 | 94.6 | 92.4 | 96.5 | 96.6 |  |
|  | 0.168 | 99.8 | 99.1 | 99.6 | 99.4 | 97.6 | 99.4 | 98.9 | 99.5 | 99.4 | 99.2 | 98.9 | 98.0 | 96.4 | 97.1 | 97.4 |
|  | 0.226 | 100.0 | 99.7 | 99.9 | 100.0 | 99.2 | 100.0 | 99.7 | 99.9 | 99.8 | 99.9 | 99.8 | 98.5 | 98.3 | 99.2 | 99.4 |
|  | 0.245 | 100.0 | 99.9 | 100.0 | 99.9 | 99.8 | 99.9 | 99.6 | 99.9 | 99.8 | 99.8 | 99.7 | 99.2 | 98.5 | 99.5 | 99.4 |
|  | 0.271 | 100.0 | 99.9 | 100.0 | 100.0 | 99.8 | 100.0 | 99.8 | 99.9 | 99.9 | 99.9 | 99.9 | 99.4 | 99.3 | 99.7 | 99.7 |
| Adaptive DCT-embedding | 0.1 | 77.8 | 78.0 | 77.8 | *69.6* | 71.2 | 71.4 | 58.0 | *66.6* | 57.9 | 66.0 | 64.5 | 65.3 | 50.1 | 51.5 | 53.8 |
|  | 0.15 | 89.8 | 89.5 | 89.0 | 81.5 | 83.6 | 83.6 | 68.8 | 82.0 | 76.8 | 77.7 | 78.0 | 77.8 | 53.3 | 66.6 | 66.8 |
|  | 0.2 | 95.7 | 95.1 | 93.0 | 89.2 | 90.9 | 91.3 | 76.5 | 90.6 | 85.0 | 86.3 | 87.7 | 82.9 | 57.5 | 77.8 | 60.6 |
|  | 0.25 | 98.6 | 97.6 | 95.4 | 93.7 | 94.7 | 94.7 | 84.4 | 96.0 | 92.0 | 92.9 | 94.2 | 90.8 | 65.8 | 85.7 | 80.0 |
|  | 0.3 | 99.3 | 98.5 | 96.7 | 96.0 | 96.7 | 96.3 | 89.5 | 97.6 | 94.5 | 95.8 | 96.7 | 93.9 | 69.4 | 91.4 | 86.5 |
|  | 0.35 | 99.6 | 99.0 | 97.6 | 97.9 | 97.8 | 97.6 | 94.7 | 99.0 | 97.2 | 98.1 | 98.8 | 96.9 | 73.5 | 94.8 | 90.9 |

TABLE III

The average MCC values over 100 experiments with SVM (LibSVM),
Fisher Linear Discriminant (FLD), and LogitReg (LR) classifier

| Hiding algorithm | Relative Payload | DC-absNJ SVM | DC-absNJ FLD | DC-absNJ LR | absNJ SVM | absNJ FLD | absNJ LR | CC-PEV SVM | CC-PEV FLD | CC-PEV LR |
|---|---|---|---|---|---|---|---|---|---|---|
| F5 | 0.051 | 0.893 | 0.903 | 0.888 | 0.850 | 0.839 | 0.842 | 0.651 | 0.817 | *0.212* |
|  | 0.077 | 0.937 | 0.934 | 0.920 | 0.890 | 0.868 | 0.885 | 0.718 | 0.866 | *0.368* |
|  | 0.105 | 0.964 | 0.961 | 0.940 | 0.941 | 0.900 | 0.930 | 0.852 | 0.943 | 0.881 |
|  | 0.137 | 0.958 | 0.977 | 0.954 | 0.865 | 0.927 | 0.948 | 0.822 | 0.961 | 0.926 |
|  | 0.185 | 0.989 | 0.985 | 0.969 | 0.966 | 0.943 | 0.607 | 0.942 | 0.985 | 0.963 |
|  | 0.282 | 0.998 | 0.995 | 0.989 | 0.979 | 0.965 | 0.246 | 0.981 | 0.992 | 0.984 |
|  | 0.354 | 1.000 | 0.995 | 0.999 | 0.995 | 0.992 | 0.988 | 0.996 | 0.996 | 0.996 |
| JPHS | 0.023 | 0.308 | 0.298 | 0.346 | 0.320 | 0.293 | 0.357 | 0.340 | 0.391 | 0.222 |
|  | 0.033 | 0.424 | 0.414 | 0.440 | 0.380 | 0.359 | 0.398 | 0.394 | 0.409 | *0.125* |
|  | 0.042 | 0.603 | 0.597 | 0.602 | 0.543 | 0.538 | 0.555 | 0.526 | 0.566 | *0.117* |
|  | 0.053 | 0.708 | 0.680 | 0.702 | 0.652 | 0.618 | 0.658 | 0.625 | 0.686 | *0.089* |
|  | 0.068 | 0.734 | 0.700 | 0.733 | 0.605 | 0.564 | 0.624 | 0.712 | 0.740 | *0.061* |
|  | 0.097 | 0.851 | 0.836 | 0.853 | 0.709 | 0.680 | 0.735 | 0.841 | 0.879 | 0.747 |
|  | 0.230 | 0.959 | 0.957 | 0.938 | 0.872 | 0.846 | 0.889 | 0.949 | 0.968 | 0.945 |
| Steghide | 0.021 | 0.851 | 0.857 | 0.842 | 0.789 | 0.775 | 0.796 | 0.660 | 0.793 | *0.234* |
|  | 0.029 | 0.915 | 0.925 | 0.907 | 0.850 | 0.842 | 0.856 | 0.715 | 0.864 | *0.374* |
|  | 0.036 | 0.964 | 0.961 | 0.948 | 0.909 | 0.897 | 0.907 | 0.818 | 0.941 | 0.868 |
|  | 0.044 | 0.976 | 0.975 | 0.978 | 0.951 | 0.932 | 0.943 | 0.890 | 0.971 | 0.930 |

TABLE III-continued

The average MCC values over 100 experiments with SVM (LibSVM),
Fisher Linear Discriminant (FLD), and LogitReg (LR) classifier

|  | | | | | | | | | | |
|---|---|---|---|---|---|---|---|---|---|---|
|  | 0.055 | 0.989 | 0.988 | 0.990 | 0.965 | 0.945 | 0.962 | 0.939 | 0.981 | 0.957 |
|  | 0.073 | 0.999 | 0.996 | 0.996 | 0.989 | 0.970 | 0.984 | 0.982 | 0.991 | 0.982 |
|  | 0.114 | 1 | 0.999 | 0.998 | 0.997 | 0.990 | 0.994 | 0.994 | 0.995 | 0.992 |
| MB1 | 0.073 | 0.992 | 0.972 | 0.631 | 0.918 | 0.903 | 0.924 | 0.887 | 0.929 | 0.889 |
|  | 0.089 | 0.999 | 0.997 | 0.997 | 0.952 | 0.930 | 0.949 | 0.913 | 0.968 | 0.917 |
|  | 0.094 | 0.997 | 0.993 | 0.988 | 0.962 | 0.948 | 0.955 | 0.915 | 0.968 | 0.935 |
|  | 0.125 | 0.995 | 0.981 | 0.987 | 0.968 | 0.925 | 0.909 | 0.924 | 0.958 | 0.933 |
|  | 0.172 | 0.998 | 0.996 | 0.998 | 0.997 | 0.986 | 0.994 | 0.992 | 0.993 | 0.989 |
|  | 0.183 | 1.000 | 0.998 | 1.000 | 0.997 | 0.993 | 0.997 | 0.991 | 0.993 | 0.988 |
|  | 0.195 | 1 | 0.999 | 1.000 | 0.999 | 0.992 | 0.999 | 0.981 | 0.995 | 0.989 |
| MB2 | 0.101 | 0.971 | 0.943 | *0.181* | 0.934 | 0.887 | 0.938 | 0.907 | 0.945 | 0.926 |
|  | 0.120 | 0.980 | 0.975 | 0.973 | 0.962 | 0.941 | 0.930 | 0.915 | 0.975 | 0.955 |
|  | 0.131 | 0.991 | 0.987 | 0.985 | 0.981 | 0.962 | 0.971 | 0.944 | 0.984 | 0.971 |
|  | 0.168 | 0.997 | 0.988 | 0.990 | 0.990 | 0.966 | 0.986 | 0.980 | 0.989 | 0.984 |
|  | 0.226 | 1.000 | 0.997 | 0.999 | 1.000 | 0.989 | 0.999 | 0.993 | 0.995 | 0.991 |
|  | 0.245 | 1 | 0.999 | 1.000 | 0.999 | 0.997 | 0.999 | 0.992 | 0.995 | 0.992 |
|  | 0.271 | 1.000 | 0.999 | 0.999 | 1.000 | 0.997 | 0.999 | 0.997 | 0.996 | 0.994 |
| Adaptive DCT-embedding | 0.1 | 0.559 | 0.559 | 0.556 | 0.404 | 0.424 | 0.429 | 0.187 | 0.332 | 0.158 |
|  | 0.15 | 0.798 | 0.791 | 0.781 | 0.640 | 0.672 | 0.672 | 0.421 | 0.639 | 0.537 |
|  | 0.2 | 0.905 | 0.902 | 0.861 | 0.788 | 0.818 | 0.826 | 0.571 | 0.811 | 0.701 |
|  | 0.25 | 0.953 | 0.951 | 0.908 | 0.877 | 0.895 | 0.894 | 0.716 | 0.920 | 0.839 |
|  | 0.3 | 0.975 | 0.970 | 0.933 | 0.923 | 0.934 | 0.926 | 0.807 | 0.951 | 0.891 |
|  | 0.35 | 0.992 | 0.980 | 0.953 | 0.959 | 0.957 | 0.952 | 0.900 | 0.980 | 0.944 |

| Hiding algorithm | Relative Payload | PEV | | | Markov | | |
|---|---|---|---|---|---|---|---|
|  |  | SVM | FLD | LR | SVM | FLD | LR |
| F5 | 0.051 | 0.711 | 0.754 | 0.698 | 0.366 | 0.554 | 0.604 |
|  | 0.077 | 0.792 | 0.816 | 0.634 | 0.393 | 0.596 | 0.578 |
|  | 0.105 | 0.868 | 0.911 | *0.542* | 0.502 | 0.742 | 0.742 |
|  | 0.137 | 0.876 | 0.946 | 0.786 | 0.514 | 0.844 | *0.377* |
|  | 0.185 | 0.953 | 0.979 | 0.879 | 0.702 | 0.923 | 0.885 |
|  | 0.282 | 0.983 | 0.990 | 0.972 | 0.876 | 0.956 | 0.925 |
|  | 0.354 | 0.996 | 0.997 | 0.997 | 0.938 | 0.981 | 0.976 |
| JPHS | 0.023 | 0.290 | 0.370 | 0.311 | 0.213 | 0.145 | 0.137 |
|  | 0.033 | 0.289 | 0.322 | 0.285 | 0.021 | 0.088 | 0.107 |
|  | 0.042 | 0.429 | 0.445 | 0.330 | 0.117 | 0.193 | 0.272 |
|  | 0.053 | 0.554 | 0.561 | 0.433 | 0.223 | 0.328 | 0.433 |
|  | 0.068 | 0.632 | 0.629 | 0.443 | 0.273 | 0.313 | 0.404 |
|  | 0.097 | 0.786 | 0.791 | 0.650 | 0.429 | 0.540 | 0.588 |
|  | 0.230 | 0.904 | 0.939 | 0.849 | 0.800 | 0.821 | 0.826 |
| Steghide | 0.021 | 0.656 | 0.681 | 0.517 | 0.470 | 0.680 | 0.672 |
|  | 0.029 | 0.727 | 0.753 | 0.524 | 0.535 | 0.739 | 0.743 |
|  | 0.036 | 0.831 | 0.868 | 0.503 | 0.688 | 0.842 | 0.803 |
|  | 0.044 | 0.883 | 0.936 | 0.520 | 0.742 | 0.913 | 0.901 |
|  | 0.055 | 0.932 | 0.961 | 0.897 | 0.836 | 0.940 | 0.920 |
|  | 0.073 | 0.981 | 0.988 | 0.959 | 0.930 | 0.972 | 0.971 |
|  | 0.114 | 0.991 | 0.995 | 0.917 | 0.981 | 0.988 | 0.989 |
| MB1 | 0.073 | 0.864 | 0.877 | *0.362* | 0.795 | 0.858 | 0.816 |
|  | 0.089 | 0.883 | 0.925 | *0.550* | 0.758 | 0.891 | 0.861 |
|  | 0.094 | 0.879 | 0.916 | *0.570* | 0.786 | 0.896 | 0.882 |
|  | 0.125 | 0.885 | 0.905 | *0.637* | 0.785 | 0.884 | 0.864 |
|  | 0.172 | 0.985 | 0.989 | 0.953 | 0.966 | 0.981 | 0.977 |
|  | 0.183 | 0.988 | 0.990 | 0.935 | 0.973 | 0.980 | 0.980 |
|  | 0.195 | 0.991 | 0.989 | 0.967 | 0.927 | 0.981 | 0.980 |
| MB2 | 0.101 | 0.863 | 0.880 | *0.445* | 0.784 | 0.860 | 0.839 |
|  | 0.120 | 0.892 | 0.931 | *0.631* | 0.755 | 0.895 | 0.879 |
|  | 0.131 | 0.967 | 0.964 | 0.882 | 0.810 | 0.929 | 0.922 |
|  | 0.168 | 0.979 | 0.983 | 0.958 | 0.901 | 0.949 | 0.943 |
|  | 0.226 | 0.995 | 0.995 | 0.967 | 0.947 | 0.981 | 0.981 |
|  | 0.245 | 0.993 | 0.994 | 0.980 | 0.949 | 0.986 | 0.982 |
|  | 0.271 | 0.997 | 0.998 | 0.986 | 0.972 | 0.990 | 0.988 |
| Adaptive DCT-embedding | 0.1 | 0.321 | 0.290 | 0.307 | −0.011 | 0.030 | 0.076 |
|  | 0.15 | 0.554 | 0.559 | 0.556 | 0.084 | 0.332 | 0.337 |
|  | 0.2 | 0.697 | 0.754 | 0.658 | 0.189 | 0.556 | 0.213 |
|  | 0.25 | 0.825 | 0.885 | 0.816 | 0.265 | 0.714 | 0.600 |
|  | 0.3 | 0.904 | 0.934 | 0.879 | 0.405 | 0.827 | 0.730 |
|  | 0.35 | 0.954 | 0.976 | 0.938 | 0.523 | 0.896 | 0.818 |

TABLE IV

The mean AUC-error over 100 experiments with SVM (LibSVM), Fisher Linear Discriminant (FLD), and LogitReg (LR) classifier

| Hiding algorithm | Relative Payload | DC-absNJ | | | absNJ | | | CC-PEV | | |
|---|---|---|---|---|---|---|---|---|---|---|
| | | SVM | FLD | LR | SVM | FLD | LR | SVM | FLD | LR |
| F5 | 0.051 | 7.7E−3* | 8.0E−3 | 8.6E−3 | 2.4E−2 | 2.4E−2 | 2.1E−2 | 3.0E−2 | 2.4E−2 | *3.6E−1* |
| | 0.077 | 4.2E−3 | 3.7E−3 | 7.1E−3 | 1.3E−2 | 1.3E−2 | 1.3E−2 | 2.0E−2 | 1.4E−2 | *2.9E−1* |
| | 0.105 | 2.1E−3 | 1.4E−3 | 9.1E−3 | 9.5E−3 | 1.1E−2 | 5.8E−3 | 1.2E−2 | 6.0E−3 | 1.5E−2 |
| | 0.137 | 1.0E−3 | 8.6E−4 | 4.8E−3 | 1.2E−2 | 7.0E−3 | 3.6E−3 | 8.8E−3 | 2.9E−3 | 8.9E−3 |
| | 0.185 | 2.9E−4 | 3.2E−4 | 1.8E−3 | 1.6E−3 | 2.8E−3 | 1.8E−1 | 3.9E−3 | 1.5E−3 | 5.1E−3 |
| | 0.282 | 3.3E−4 | 7.8E−4 | 1.3E−3 | 1.4E−3 | 2.1E−3 | 3.6E−1 | 1.6E−3 | 5.0E−4 | 1.8E−3 |
| | 0.354 | 0 | 3.8E−6 | 1.3E−6 | 8.5E−5 | 6.9E−4 | 3.3E−4 | 3.7E−5 | 2.8E−4 | 4.7E−4 |
| JPHS | 0.023 | 1.3E−1 | 1.4E−1 | 1.4E−1 | 1.4E−1 | 1.4E−1 | 1.3E−1 | 1.3E−1 | 1.3E−1 | 3.6E−1 |
| | 0.033 | 1.3E−1 | 1.4E−1 | 1.3E−1 | 1.6E−1 | 1.6E−1 | 1.5E−1 | 1.2E−1 | 1.5E−1 | 4.2E−1 |
| | 0.042 | 9.3E−2 | 9.8E−2 | 9.7E−2 | 1.2E−1 | 1.2E−1 | 1.1E−1 | 1.0E−1 | 1.1E−1 | 4.2E−1 |
| | 0.053 | 5.6E−2 | 5.8E−2 | 5.6E−2 | 7.6E−2 | 8.0E−2 | 7.4E−3 | 6.2E−2 | 6.0E−2 | 4.4E−1 |
| | 0.068 | 4.3E−2 | 5.0E−2 | 4.4E−2 | 8.3E−2 | 8.9E−2 | 7.9E−2 | 4.2E−2 | 4.1E−2 | 4.6E−1 |
| | 0.097 | 1.6E−2 | 1.8E−2 | 1.7E−2 | 4.5E−2 | 5.1E−2 | 4.0E−2 | 1.4E−2 | 1.1E−2 | 6.6E−2 |
| | 0.230 | 1.4E−3 | 1.8E−3 | 6.9E−3 | 8.9E−3 | 1.2E−2 | 7.5E−3 | 2.1E−3 | 1.8E−3 | 7.0E−3 |
| Steghide | 0.021 | 1.5E−2 | 1.4E−2 | 1.6E−2 | 2.5E−2 | 2.7E−2 | 2.5E−2 | 3.0E−2 | 2.7E−2 | 3.6E−2 |
| | 0.029 | 7.6E−3 | 5.0E−3 | 8.4E−3 | 1.7E−2 | 1.7E−2 | 1.6E−2 | 2.0E−2 | 1.6E−2 | 3.8E−1 |
| | 0.036 | 1.4E−3 | 9.3E−4 | 5.5E−3 | 8.4E−3 | 7.2E−3 | 7.1E−3 | 8.6E−3 | 5.2E−3 | 2.1E−2 |
| | 0.044 | 2.5E−4 | 3.0E−4 | 6.5E−4 | 4.0E−3 | 3.7E−3 | 3.6E−3 | 4.3E−3 | 3.3E−3 | 7.2E−3 |
| | 0.055 | 1.7E−3 | 1.5E−4 | 1.8E−4 | 1.4E−3 | 2.4E−3 | 2.4E−3 | 1.8E−3 | 2.3E−3 | 4.1E−3 |
| | 0.073 | 4.9E−7 | 7.6E−6 | 1.6E−5 | 8.3E−5 | 4.7E−4 | 3.8E−4 | 2.6E−4 | 1.4E−3 | 2.2E−3 |
| | 0.114 | 0 | 7.4E−5 | 6.1E−6 | 1.0E−5 | 7.2E−5 | 4.6E−5 | 4.6E−5 | 7.6E−4 | 1.1E−3 |
| MB1 | 0.073 | 4.3E−5 | 4.8E−4 | *1.6E−1* | 4.1E−3 | 6.3E−3 | 4.1E−3 | 1.4E−2 | 9.0E−3 | 2.1E−2 |
| | 0.089 | 4.1E−6 | 3.3E−4 | 1.6E−4 | 1.9E−3 | 3.2E−3 | 2.3E−3 | 4.6E−3 | 3.0E−3 | 1.6E−2 |
| | 0.094 | 4.3E−5 | 1.2E−4 | 5.3E−4 | 2.9E−3 | 3.5E−3 | 2.3E−3 | 6.1E−3 | 2.9E−3 | 1.1E−2 |
| | 0.125 | 3.8E−6 | 5.1E−5 | 5.7E−4 | 1.0E−3 | 1.5E−3 | 3.3E−2 | 6.0E−3 | 2.8E−3 | 7.0E−3 |
| | 0.172 | 6.5E−7 | 7.2E−5 | 1.8E−5 | 3.6E−6 | 3.5E−5 | 4.0E−5 | 1.9E−4 | 1.1E−3 | 1.6E−3 |
| | 0.183 | 0 | 3.1E−8 | 8.6E−7 | 2.9E−6 | 3.8E−6 | 1.7E−5 | 8.2E−5 | 1.0E−3 | 1.5E−3 |
| | 0.195 | 0 | 2.9E−5 | 6.2E−8 | 3.0E−6 | 5.8E−6 | 1.6E−6 | 2.5E−4 | 7.3E−4 | 1.3E−3 |
| MB2 | 0.101 | 6.1E−4 | 1.6E−3 | *4.0E−1* | 3.0E−3 | 4.5E−3 | 0.3E−2 | 1.3E−3 | 6.4E−3 | 1.2E−2 |
| | 0.120 | 2.0E−4 | 6.5E−4 | 1.6E−3 | 1.4E−3 | 2.3E−3 | 1.7E−2 | 4.6E−3 | 2.2E−3 | 4.1E−3 |
| | 0.131 | 4.6E−5 | 2.8E−4 | 1.4E−3 | 6.3E−4 | 1.4E−3 | 3.3E−3 | 3.9E−3 | 2.1E−3 | 3.7E−3 |
| | 0.168 | 4.2E−6 | 8.2E−5 | 1.0E−4 | 6.5E−5 | 5.5E−4 | 4.3E−4 | 8.4E−4 | 1.3E−3 | 1.8E−3 |
| | 0.226 | 0 | 7.9E−6 | 4.2E−7 | 2.5E−7 | 3.5E−5 | 3.5E−6 | 6.9E−5 | 7.4E−4 | 1.1E−3 |
| | 0.245 | 0 | 7.0E−5 | 1.6E−8 | 3.1E−7 | 6.3E−6 | 7.6E−7 | 2.4E−4 | 5.6E−4 | 8.3E−4 |
| | 0.271 | 0 | 1.7E−4 | 6.4E−7 | 1.3E−17 | 5.1E−6 | 7.8E−8 | 4.6E−5 | 6.3E−4 | 7.7E−4 |
| Adaptive DCT-embedding | 0.1 | 1.3E−1 | 1.3E−1 | 1.4E−1 | 2.2E−1 | 2.0E−1 | 2.0E−1 | 3.2E−1 | 2.7E−1 | 4.1E−1 |
| | 0.15 | 3.3E−2 | 3.5E−2 | 3.9E−2 | 8.9E−2 | 8.2E−2 | 8.1E−2 | 1.6E−1 | 1.1E−1 | 1.8E−1 |
| | 0.2 | 8.5E−3 | 1.0E−2 | 2.7E−2 | 3.4E−2 | 2.8E−2 | 2.6E−2 | 8.2E−2 | 3.9E−2 | 8.4E−2 |
| | 0.25 | 1.9E−3 | 3.6E−3 | 1.0E−2 | 1.2E−2 | 1.1E−2 | 1.1E−2 | 3.5E−2 | 1.4E−2 | 3.2E−2 |
| | 0.3 | 5.5E−4 | 1.9E−3 | 5.7E−3 | 5.0E−3 | 4.8E−3 | 1.2E−3 | 1.7E−2 | 7.4E−3 | 2.0E−2 |
| | 0.35 | 4.7E−5 | 8.7E−4 | 2.7E−3 | 1.7E−3 | 2.6E−3 | 4.2E−3 | 6.1E−3 | 1.8E−3 | 6.8E−3 |

| Hiding algorithm | Relative Payload | PEV | | | Markov | | |
|---|---|---|---|---|---|---|---|
| | | SVM | FLD | LR | SVM | FLD | LR |
| F5 | 0.051 | 4.6E−2 | 3.9E−2 | 7.1E−2 | 8.9E−2 | 9.4E−2 | 9.2E−2 |
| | 0.077 | 2.6E−2 | 2.3E−2 | *1.3E−1* | 8.6E−2 | 8.1E−2 | *1.3E−1* |
| | 0.105 | 1.1E−2 | 8.8E−3 | *1.9E−1* | 5.0E−2 | 4.6E−2 | 5.1E−2 |
| | 0.137 | 4.6E−3 | 3.4E−3 | 7.5E−2 | 3.9E−2 | 2.2E−2 | 2.9E−1 |
| | 0.185 | 2.2E−3 | 2.1E−3 | 4.0E−2 | 1.7E−2 | 9.3E−3 | 1.9E−2 |
| | 0.282 | 7.7E−4 | 4.0E−4 | 6.8E−3 | 6.1E−3 | 5.3E−3 | 1.3E−2 |
| | 0.354 | 2.7E−5 | 2.2E−4 | 3.6E−4 | 1.2E−3 | 1.6E−3 | 2.3E−3 |
| JPHS | 0.023 | 1.4E−1 | 1.4E−1 | 2.2E−1 | 1.5E−1 | 1.8E−1 | 2.1E−1 |
| | 0.033 | 1.8E−1 | 1.9E−1 | 2.6E−1 | 2.9E−1 | 2.8E−1 | 2.7E−1 |
| | 0.042 | 1.5E−1 | 1.5E−1 | 2.6E−1 | 2.5E−1 | 2.6E−1 | 2.3E−1 |
| | 0.053 | 1.1E−1 | 1.1E−1 | 2.0E−1 | 1.6E−1 | 1.9E−1 | 1.6E−1 |
| | 0.068 | 7.3E−2 | 8.6E−2 | 2.1E−1 | 1.6E−1 | 1.9E−1 | 1.6E−1 |
| | 0.097 | 2.6E−2 | 3.1E−2 | 1.2E−1 | 8.9E−2 | 9.5E−2 | 8.2E−2 |
| | 0.230 | 4.4E−3 | 3.7E−3 | 4.0E−2 | 1.7E−2 | 1.8E−2 | 3.3E−2 |
| Steghide | 0.021 | 6.3E−2 | 5.5E−2 | *1.7E−1* | 4.8E−2 | 5.5E−2 | 6.9E−2 |
| | 0.029 | 4.8E−2 | 4.1E−2 | *1.8E−1* | 3.8E−2 | 4.5E−2 | 4.7E−2 |
| | 0.036 | 2.0E−2 | 1.3E−2 | *2.1E−1* | 1.8E−2 | 2.0E−2 | 4.4E−2 |
| | 0.044 | 8.6E−3 | 5.0E−3 | *2.1E−1* | 8.6E−3 | 9.3E−3 | 1.1E−2 |
| | 0.055 | 2.2E−3 | 2.0E−3 | 2.2E−2 | 7.0E−3 | 6.7E−3 | 8.4E−3 |
| | 0.073 | 2.8E−4 | 9.6E−4 | 1.1E−2 | 1.3E−3 | 2.8E−3 | 2.6E−3 |
| | 0.114 | 5.3E−5 | 3.1E−4 | 3.6E−2 | 4.4E−5 | 7.3E−4 | 9.7E−4 |
| MB1 | 0.073 | 9.8E−3 | 1.6E−2 | *3.0E−1* | 1.5E−2 | 2.1E−2 | 4.9E−2 |
| | 0.089 | 5.2E−3 | 6.5E−3 | *2.0E−1* | 9.5E−3 | 1.2E−2 | 2.4E−2 |
| | 0.094 | 6.1E−3 | 6.5E−3 | *1.9E−1* | 6.4E−3 | 1.2E−2 | 1.8E−2 |
| | 0.125 | 6.0E−3 | 5.8E−3 | *1.5E−1* | 8.9E−3 | 1.2E−2 | 2.7E−3 |
| | 0.172 | 8.4E−5 | 4.5E−4 | 1.6E−2 | 7.9E−5 | 1.8E−3 | 2.3E−3 |

TABLE IV-continued

The mean AUC-error over 100 experiments with SVM (LibSVM), Fisher
Linear Discriminant (FLD), and LogitReg (LR) classifier

|  | | | | | | | |
|---|---|---|---|---|---|---|---|
|  | 0.183 | 6.5E−5 | 4.4E−4 | 2.6E−2 | 4.9E−5 | 1.9E−3 | 2.5E−3 |
|  | 0.195 | 7.1E−6 | 5.6E−4 | 9.9E−3 | 3.2E−4 | 1.8E−3 | 2.3E−3 |
| MB2 | 0.101 | 9.0E−3 | 1.4E−2 | *3.6E−1* | 1.4E−2 | 2.1E−2 | 4.1E−2 |
|  | 0.120 | 4.5E−3 | 4.5E−3 | *1.6E−1* | 8.8E−3 | 1.1E−2 | 1.7E−2 |
|  | 0.131 | 2.5E−4 | 2.0E−3 | 3.4E−2 | 1.8E−3 | 7.9E−3 | 9.5E−3 |
|  | 0.168 | 1.3E−3 | 1.1E−3 | 1.0E−2 | 8.9E−3 | 4.4E−3 | 8.2E−3 |
|  | 0.226 | 5.3E−6 | 3.5E−4 | 1.3E−2 | 2.5E−4 | 1.4E−3 | 2.2E−3 |
|  | 0.245 | 9.9E−6 | 4.6E−4 | 5.6E−3 | 1.1E−4 | 1.2E−3 | 1.7E−3 |
|  | 0.271 | 2.9E−4 | 3.3E−4 | 5.0E−3 | 2.5E−6 | 1.0E−3 | 1.3E−3 |
| Adaptive | 0.1 | 2.9E−1 | 3.0E−1 | 2.9E−1 | 5.0E−1 | 4.8E−1 | 4.7E−1 |
| DCT- | 0.15 | 1.5E−1 | 1.4E−1 | 1.5E−1 | 3.1E−1 | 2.8E−1 | 3.1E−1 |
| embedding | 0.2 | 8.0E−2 | 5.5E−2 | 1.2E−1 | 2.0E−1 | 1.5E−1 | 3.8E−1 |
|  | 0.25 | 3.1E−2 | 1.8E−2 | 3.9E−2 | 1.4E−1 | 7.9E−2 | 1.4E−1 |
|  | 0.3 | 1.1E−2 | 7.3E−3 | 2.0E−2 | 9.3E−2 | 3.7E−2 | 7.6E−2 |
|  | 0.35 | 3.7E−3 | 1.9E−3 | 7.1E−3 | 5.9E−2 | 1.8E−2 | 4.3E−2 |

*7.7E−3 is represented in a scientific notation of the value $7.7 \times 10^{-3} = 0.007$; and so on.

Figure 4:
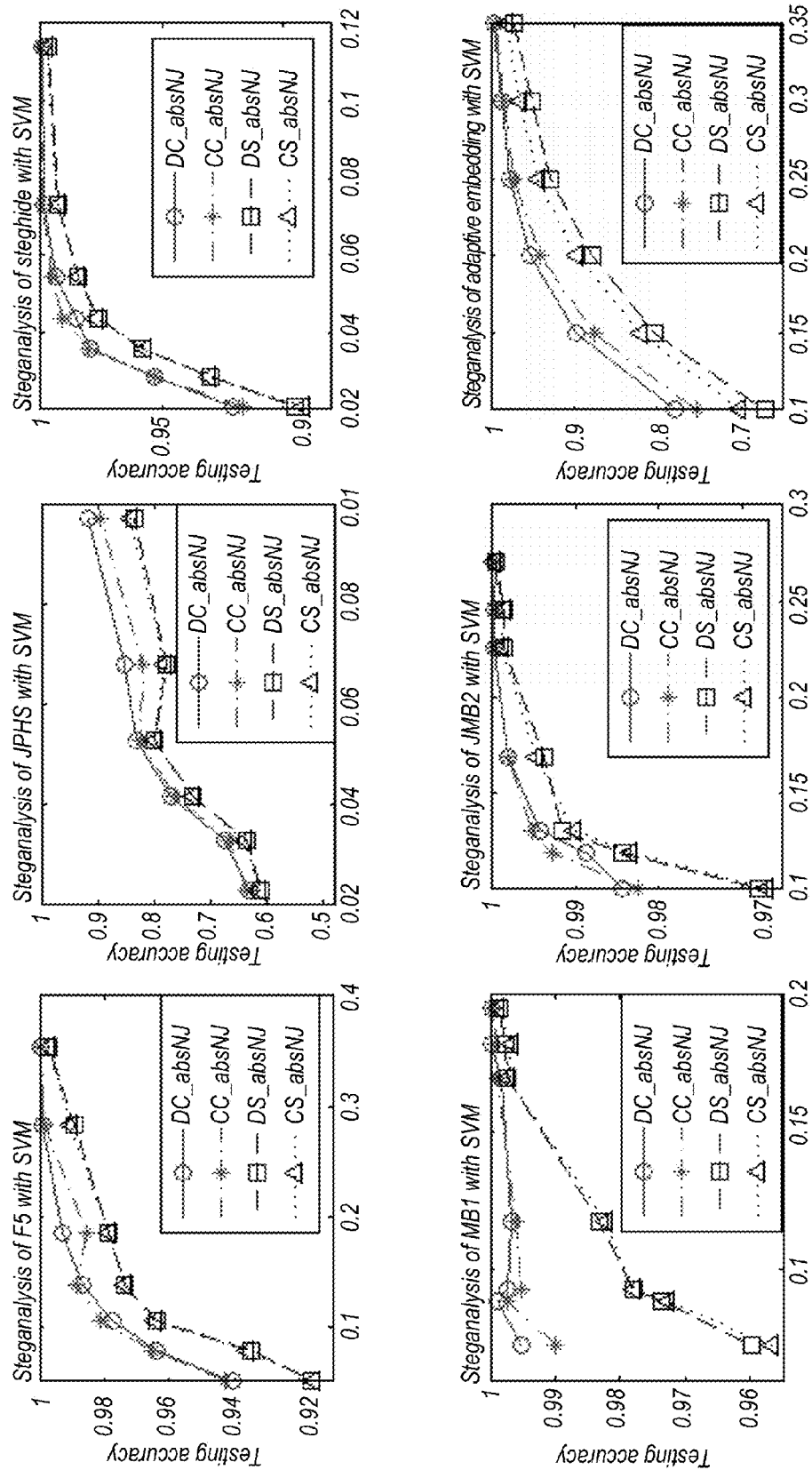
FIG. 4 illustrates examples of detection performances, using SVM, measured by mean testing accuracy for an experiment.
Figure 5:
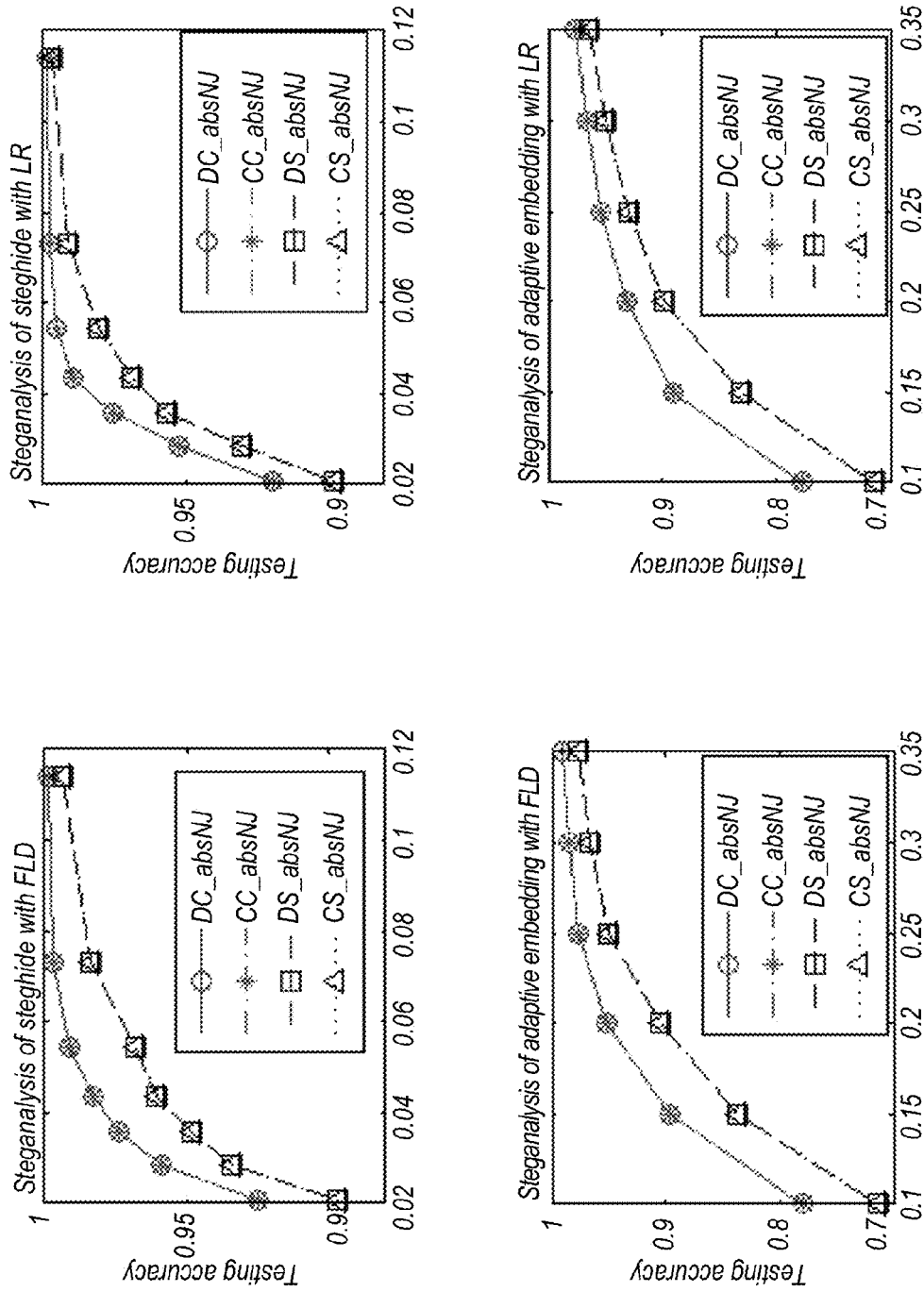
FIG. 5 illustrates examples of detection performances, using FLD and LR, measured by mean testing accuracy for an experiment.

Referring again to Table 1, the calibrated feature sets in section III, DC-absNJ, CC-absNJ, DS-absNJ, and CS-absNJ are compared FIG. 4 plots the mean detection accuracy over 100 experiments using SVM. FIG. 5 shows the results by using FLD and LR classifier (only the results in detecting steghide and adaptive DCT-embedding are shown in FIG. 5; the similar detection results on F5, JPHS, MB1 and MB2 are obtained but not given in FIG. 5 in order to save space).

In this case, the experimental results show that 63-cropping-based approach outperforms scaling-based approach. In this particular example, there may not be a significant difference between differential calibration and Cartesian calibration in terms of the detection performance.

Example 2

Steganalysis of DCT-Embedding-Based Adaptive Steganography

1000 BOSSRank cover images are converted into JPEG images with the quality factor "75". The JPEG-based adaptive steganograms are produced by using the DCT-embedding based hiding tool, and the parameter of hiding bits per non-zero-AC (bpac) is set from 0.1 to 0.4 with the step of 0.05 bpac. 72-dimensional ratio features are extracted, defined by (13) and (14), or diff-absNJ-ratio, and 144-dimensional features, or ref-diff-absNJ, from the JPEG covers and the adaptive steganograms. To compare our feature sets and a recently well-designed feature set, CC-PEV, 548-dimensional CC-PEV features are extracted from the covers and steganograms. A logistic regression classifier and Support Vector Machines (SVM), are used for the detection. In each experiment, 50% samples are randomly selected for training, and the other 50% samples are used for testing. In each experiment, the testing results can be divided into True Negative (TN), False Negative (FN), False Positive (FP), and True Positive (TP). Without losing a generality, the detection accuracy is measured by 0.5*TN/(TN+FP)+0.5*TP/(TP+FN). To compare the detection performance, two hundred experiments are operated for each feature set at each hiding ratio by using each classifier, and the mean detection accuracy over 200 experiments is obtained. In the application of SVM, two SVM algorithms, LibSVM and SVM_light are adopted, and the detection performance of these two SVM implementation algorithms are compared with linear, polynomial, and radial basis function (RBF) kernels. On average, in our experiments, a linear LibSVM hits the highest detection accuracy.

Experimental results. Table 5 lists the mean values of detection accuracy on testing feature sets over two hundred experiments by using the 72-dimensional diff-absNJ-ratio feature set, 144-dimensional ref-diffabsNJ feature set, and 548-dimensional CC-PEV feature set with linear LibSVM and logistic regression classifier.

TABLE 5

Average detection accuracy (%) over 200 experiments at different hiding ratios (measured by relative payload, bpac), by applying SVM and logistic regression classifier to 548-dim CC-PEV, 72-dim diff-absNJ-ratio, and 144-dim ref-diff-absNJ.

|  | CC-PEV | | diff-absNJ-ratio | | ref-diff-absNJ | |
|---|---|---|---|---|---|---|
| bpac | SVM | LogitReg | SVM | LogitReg | SVM | LogitReg |
| 0.1 | 57.7 | 58.0 | 76.8 | 76.7 | 77.2 | 74.6 |
| 0.15 | 67.7 | 70.0 | 88.5 | 88.3 | 89.3 | 85.5 |
| 0.2 | 76.9 | 79.6 | 94.2 | 92.8 | 94.8 | 91.9 |
| 0.25 | 84.8 | 88.3 | 97.4 | 96.9 | 97.5 | 97.0 |
| 0.3 | 88.9 | 92.5 | 98.8 | 98.3 | 98.7 | 98.3 |
| 0.35 | 94.2 | 96.0 | 99.6 | 99.2 | 99.5 | 99.1 |
| 0.4 | 96.9 | 98.0 | 99.8 | 99.4 | 99.7 | 99.3 |

The experimental results show that the diff-absNJ-ratio and ref-diff-absNJ feature sets outperform CC-PEV feature set regarding detection accuracy. Especially at the relative payload parameter of 0.1 bpac and 0.15 bpac, diff-absNJ-ratio and ref-diffabsNJ feature sets improve the detection accuracy by about 15-20%, either using SVM or using logistic regression classifier. Additionally, the mean and the standard deviation (STD) values of true negative rate (TNR) and true positive rate (TPR) over 200 experiments are given by FIG. 4y. In comparison to CC-PEV, the methods described herein may demonstrate the improved results, either in terms of detection accuracy or the detection stability across different experiments.

Example 3

Steganalysis of YASS

1) Setup

Figure 6:
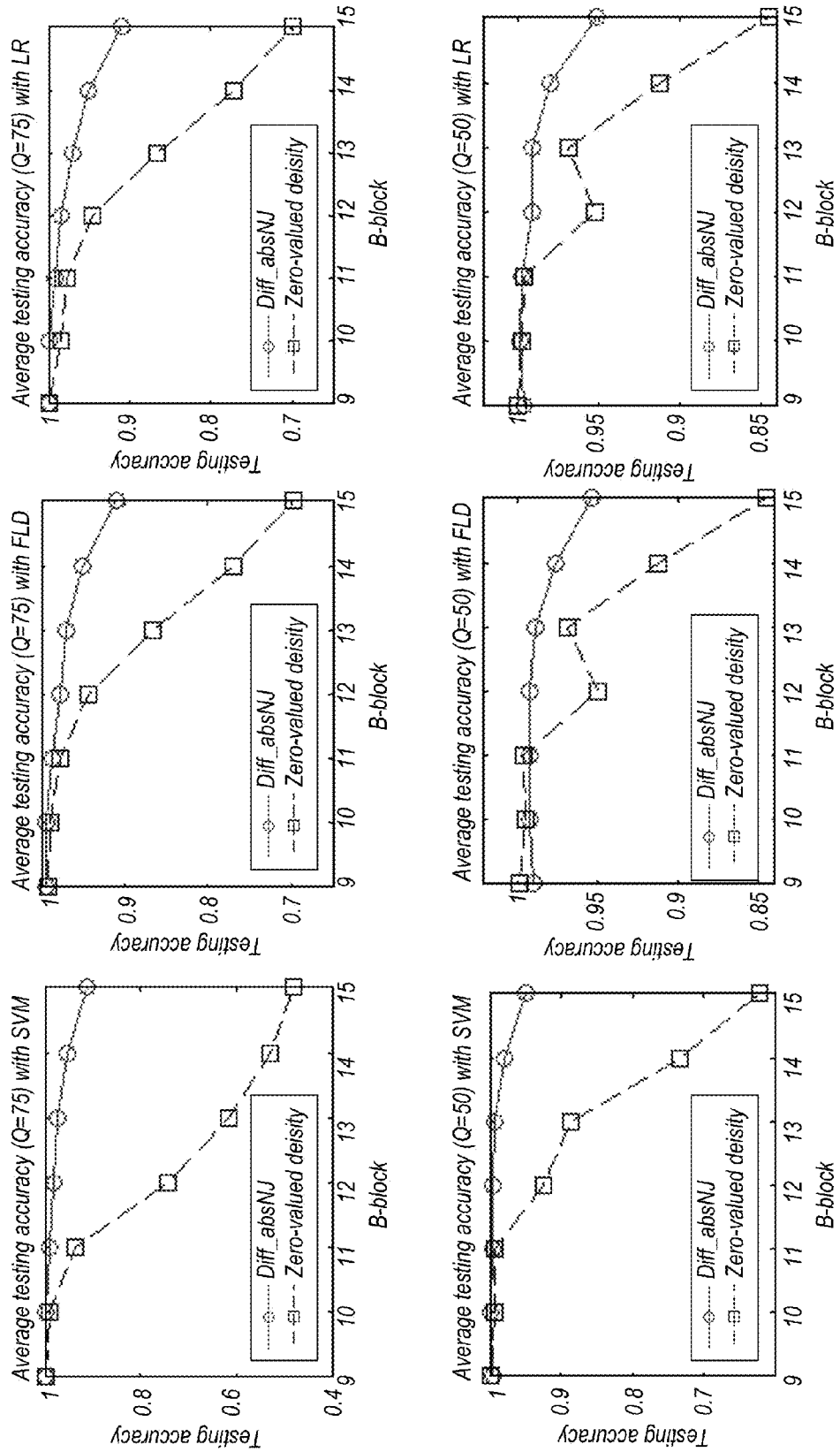
FIG. 6 illustrates an example of detection accuracy in steganalysis of YASS.

1000 BOSSRank cover images are used for YASS embedding. QFh=QFa=was set at 75 and QFh=QFa=are set at 5. Accordingly, 1000 BOSSRank cover images in JPEG format at the quality factor of 75 and 50 respectively, which are used as JPEG covers. In creation of YASS steganograms, QFh and QFa may be set to the same quantization factor in order to avoid double JPEG compression, because the YASS steganograms might be detected by using the detection method to expose double JPEG compression. In this experiment, the embedding parameter T of B-block size is set from 9 to 15. To conduct a comparative study, diff_absNJ features defined in (14) may be extracted, and the zerovalued probability features presented. SVM, FLD and logistic regression classifier are used for classification. In each experiment, 50% samples are randomly selected for training, and the other 50% samples are used for testing; 200 experiments are operated for each feature set at each B-block size by using each learning classifier.
2) Experimental Results As before, the testing accuracy is measured by 0.5*TP/(TP+FN)+0.5*TN/(TN+FN). The mean testing accuracy values over 200 experiments are plotted in FIG. 4. As shown by FIG. 6, the detection method performs well when detecting the YASS steganograms that are produced with small B-block parameter; however, the detection performance may deteriorate while the parameter of B-block size increases. By comparison, neighboring joint density-based approach described herein may perform well either in small or large parameter of B-block size, using SVM, FLD or logistic regression classifier.

Figure 7:
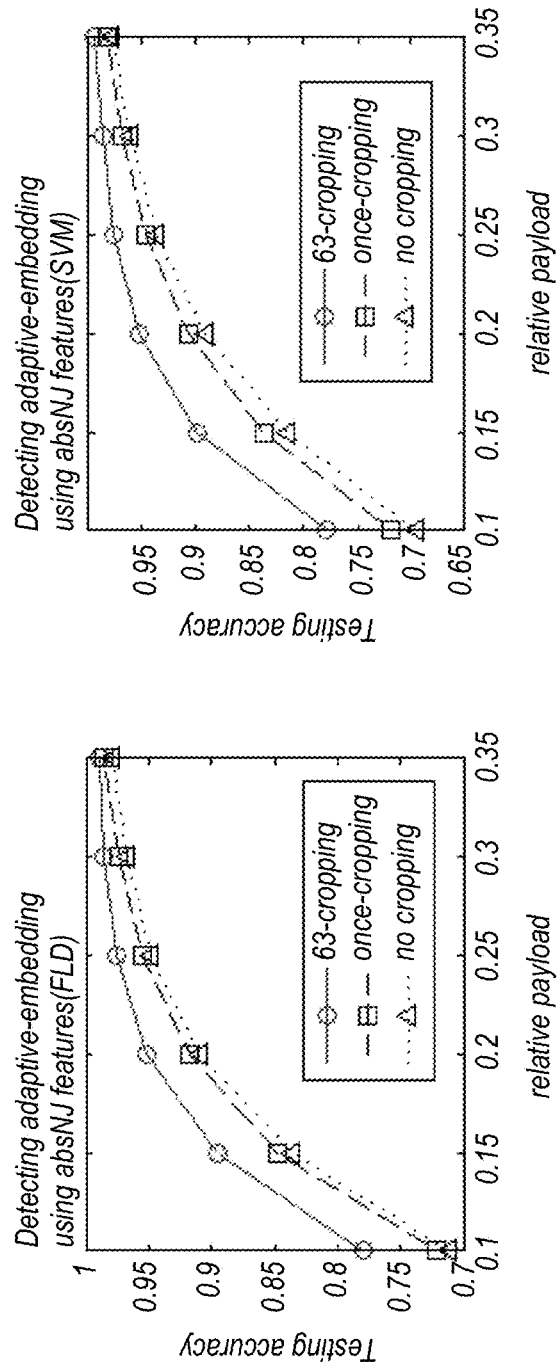
FIG. 7 compares the mean detection accuracy over 100 experiments by using neighboring joint density-based approach with 63 cropping, the approach with one time-cropping (cropping by 4 rows and 4 columns), and the approach without any cropping

In steganalysis of DCT-embedding based adaptive steganography, to obtain the calibrated neighboring joint density features, the JPEG image under scrutiny may, in some embodiments, be cropped 63 times, or shifting from (0, 1) to (7, 7), the neighboring joint density features may be extracted from these 63 cropped versions. The mean values of the features may be used as calibrated features. Compared to the calibration that only takes once-cropping (e.g., only shifting by 4 rows and 4 columns), the computation cost may be relatively high. However, the calibrated neighboring joint density obtained by 63-cropping may be generally closer to the neighboring joint density of original cover. Because DCT-embedding-based adaptive steganography aims to remain original statistical property through Syndrome-Trellis Codes and minimize the distortion cost, the differences of the features from a cover and from the steganogram may be very small; in such case, if the calibrated features are closer to those from original cover, the detection accuracy should be improved. FIG. 7 compares the mean detection accuracy over 100 experiments by using neighboring joint density-based approach with 63 cropping, the approach with one time-cropping (cropping by 4 rows and 4 columns), and the approach without any cropping. Compared to original neighboring joint density-based approach, the approach with one-time cropping may improve the detection accuracy slightly, and the approach with 63-time cropping may noticeably improve the detection performance. 63-time-cropping-based approach may be not only useful to generate the reference features for steganalysis, but also may detect misaligned cropping and recompression with the same quantization matrix and relevant forgery including copy-paste and composite forgery that are derived from the same camera source and encoded with the same quantization table. In some cases, cropping-based calibration may be generally better than scaling-based calibration.

Figure 8:
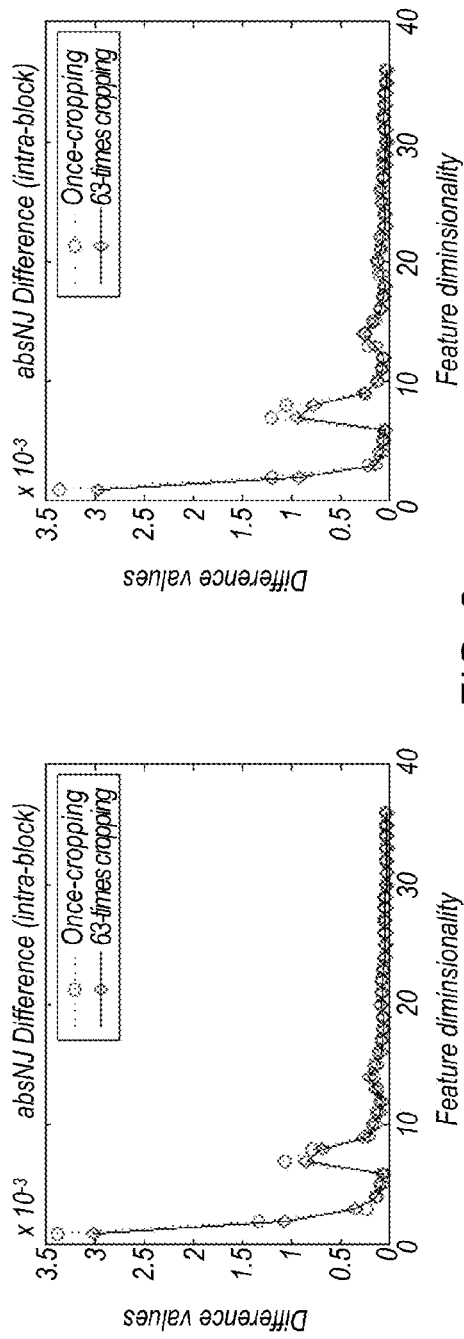
FIG. 8 illustrates a comparison of the difference of neighboring joint density between once-cropping and 63-times-cropping.

FIG. 8 illustrates a comparison of the difference of neighboring joint density between once-cropping and 63-times-cropping.

Figure 9:
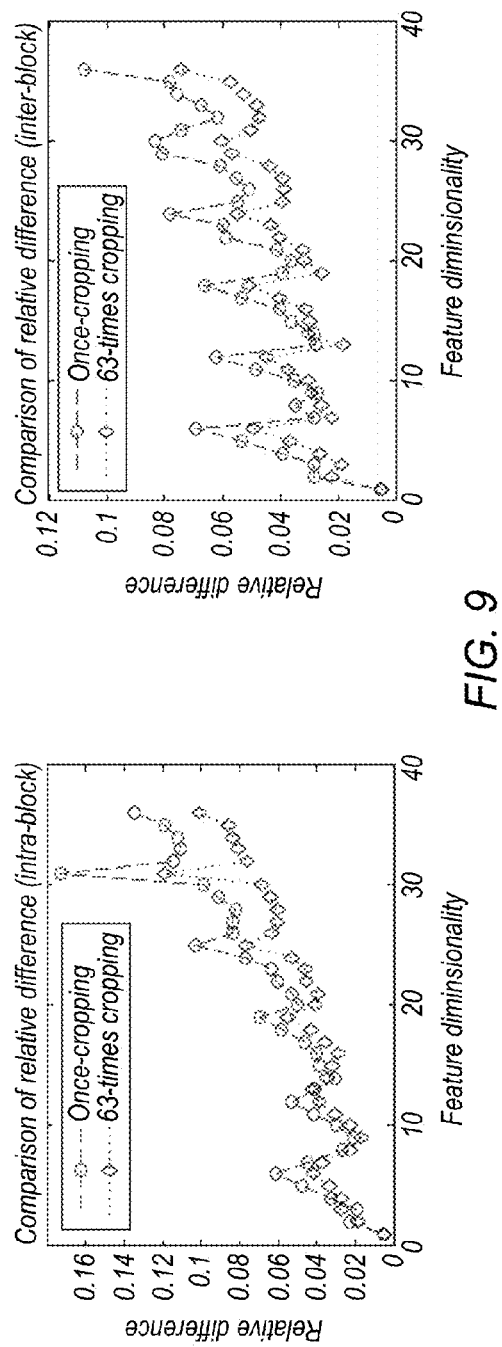
FIG. 9 illustrates a comparison of the relative difference of neighboring joint density between once-cropping and 63-times-cropping.

FIG. 9 illustrates a comparison of the relative difference of neighboring joint density between once-cropping and 63-times-cropping. Relative difference is calculated by absNJ c x, y absNJ x, y absNJ x, y wherein absNJ x, y and absNJ c x, y stand for the neighboring joint density from un-calibrated image and from the calibrated version respectively.

63-time-cropping may be better than these calibrations hiding simulation-based calibration, that is, simulating the hiding to the image under scrutiny with different amounts of random binary bits, and extracting the features from these calibrated images as reference features, and then combining these features with original features for training and testing. In steganalysis of YASS, the detection algorithm may not search all candidate host blocks, which may result in deteriorated detection performance when detecting the steganograms that are produced by a large B-block parameter. This may be overcome in some embodiments by searching all possible candidate blocks and comparing the neighboring joint density of these candidate blocks and the non-candidate neighboring blocks. In some YASS embedding algorithms, the embedding is limited to the 19 low-frequency AC coefficient, and the upper left of the first B-block is overlapped with the upper-left of the first 8×8 block. If it is assumed that the embedding positions of binary hidden bits are not limited into the 19 low-frequency AC DCT coefficients, the approach described herein still effective for the detection, because the feature extraction need not be limited to the position of 19 low-frequency AC coefficients. If the first B-block randomly is misplaced from the upper left point of the first 8×8 block, possibility of mismatching may be exhausted. There are 64 combinations including the original exact matching, accordingly the diff_absNJ features may be retrieved in each mismatching, in order to detect such polymorphism of YASS steganographic system. As demonstrated by FIG. 6, the detection accuracy under low image quality QFh=QFa=50 may be generally higher than the detection accuracy under high image quality QFh=QFa=75. Large quantization steps may comply with low image quality and hence produce a smaller magnitude of quantized DCT coefficients. The chance of the modification to these small magnitude quantized DCT coefficients by YASS QIM embedding accordingly may increase, and the amount of relative modification may increase. As a result, the detection of the YASS steganograms that are produced at low quality may be generally better than the results on the high quality factor.

In some embodiments, to design undetectable steganography in JPEG images, based on the relationship between image complexity and detection performance, a statistically invisible steganography (SIS) in JPEG images may be employed by hiding data in the AC DCT coefficients with the value of large amount in the blocks of high image complexity. In certain embodiments, the security level of DCT-embedding-based adaptive steganographic system could be further improved, by integrating the methodology of adaptive steganography and the method of SIS.

Some algorithms that may be used to select optimal feature set and achieve the best classification performance in various embodiments may include SVM-RFE, MSVM-RFE, recursive feature addition based on supervised learning and similarity measurement, minimum Redundancy Maximum Relevance (mRMR), and unified probabilistic model-based global and local unsupervised feature selection. Steganalysis performance may be improved by employing feature selection algorithms in order to obtain an optimal feature set.

In certain embodiments, an algorithm detects YASS embedding by detecting an increase in the zero coefficients of the host blocks. In certain embodiments, an algorithm detects YASS embedding modifies the neighboring joint density of the DCT coefficients.

Although many of the embodiments described above have been described in the context of detecting adaptive steganographic system, methods and systems of described herein may be used to detect non-adaptive steganographic systems.

Figure 10:
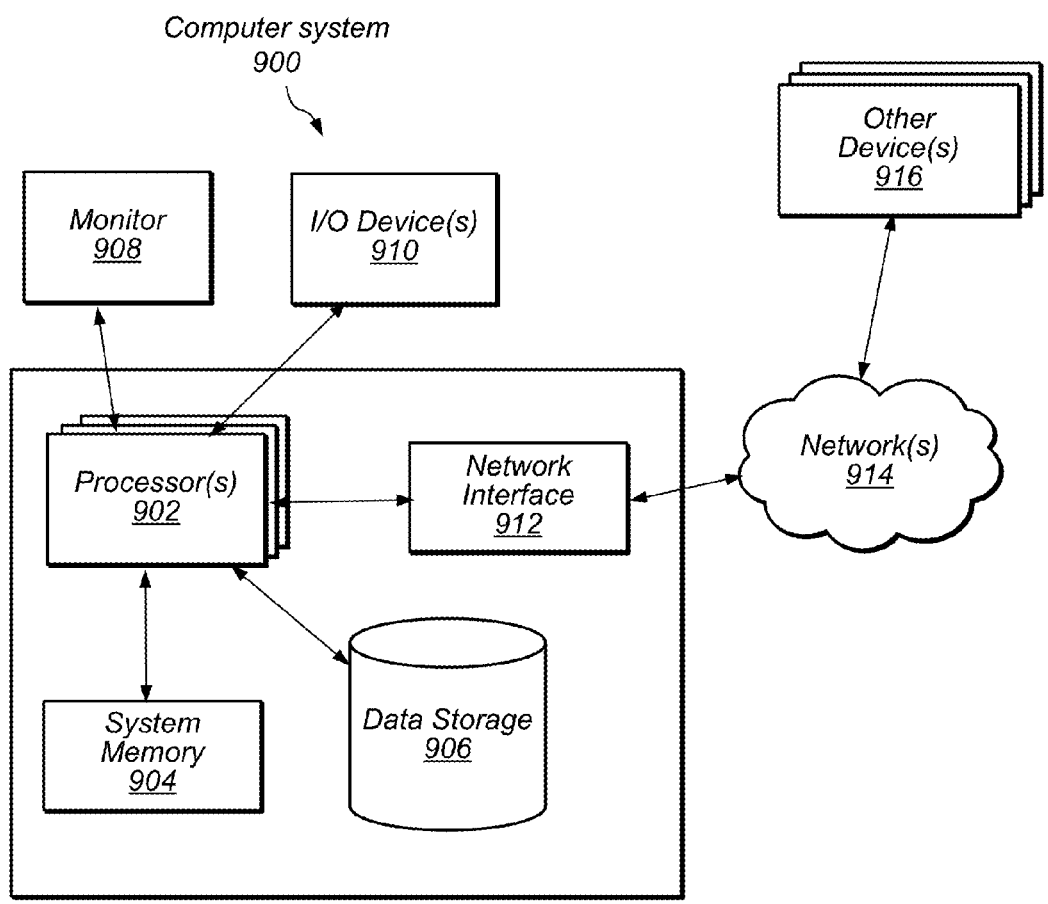
FIG. 10 illustrates a computer system that may be used to implement detection of hidden messages and information in various embodiments.

FIG. 10 illustrates a computer system that may be used to implement detection of hidden messages and information, such as information produced by steganographic systems, in various embodiments. Computer system 900 includes one or more processors 902, system memory 904, and data storage device 906. Program instructions may be stored on system memory 904. Processors 902 may access program instructions on system memory 904. Processors 902 may access data storage device 906. Users may be provided with information from computer system 900 by way of monitor 908. Users interact with computer system 900 by way of I/O devices 910. An I/O device 910 may be, for example, a keyboard or a mouse. Computer system 900 may include, or connect with, other devices 916. Elements of computer system 900 may connect with other devices 916 by way of network 914 via network interface 912. Network interface 912 may be, for example, a network interface card. In some embodiments, messages are exchanged between computer system 900 and other devices 916, for example, via a transport protocol, such as internet protocol.

Computer systems may include a memory medium on which computer programs according to various embodiments may be stored. The term "memory medium" is intended to include an installation medium, e.g., Compact Disc Read Only Memories (CD-ROMs), a computer system memory such as Dynamic Random Access Memory (DRAM), Static Random Access Memory (SRAM), Extended Data Out Random Access Memory (EDO RAM), Double Data Rate Random Access Memory (DDR RAM), Rambus Random Access Memory (RAM), etc., or a non-volatile memory such as a magnetic media, e.g., a hard drive or optical storage. The memory medium may also include other types of memory or combinations thereof. In addition, the memory medium may be located in a first computer, which executes the programs or may be located in a second different computer, which connects to the first computer over a network. In the latter instance, the second computer may provide the program instructions to the first computer for execution. A computer system may take various forms such as a personal computer system, mainframe computer system, workstation, network appliance, Internet appliance, personal digital assistant ("PDA"), television system or other device. In general, the term "computer system" may refer to any device having a processor that executes instructions from a memory medium.

The memory medium may store a software program or programs operable to implement embodiments as described herein. The software program(s) may be implemented in various ways, including, but not limited to, procedure-based techniques, component-based techniques, and/or object-oriented techniques, among others. For example, the software programs may be implemented using ActiveX controls, C++ objects, JavaBeans, Microsoft Foundation Classes (MFC), browser-based applications (e.g., Java applets), traditional programs, or other technologies or methodologies, as desired. A CPU executing code and data from the memory medium may include a means for creating and executing the software program or programs according to the embodiments described herein.

Various embodiments may also include receiving or storing instructions and/or data implemented in accordance with the foregoing description upon a carrier medium. Suitable carrier media may include storage media or memory media such as magnetic or optical media, e.g., disk or CD-ROM, as well as signals such as electrical, electromagnetic, or digital signals, may be conveyed via a communication medium such as a network and/or a wireless link.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Methods may be implemented manually, in software, in hardware, or a combination thereof. The order of any method may be changed, and various elements may be added, reordered, combined, omitted, modified, etc. Changes may be made in the elements described herein without departing from the spirit and scope of the invention as described in the following claims.

What is claimed is:

1. A method of detecting steganography in a compressed digital image, comprising:
    extracting one or more neighboring joint density features from an image under scrutiny;
    decoding the image under scrutiny to a spatial domain;
    cropping the image to create a cropped image;
    encoding the cropped image;
    extracting one or more neighboring joint density features from the encoded cropped image; and
    detecting steganography in the image based on at least one difference in a neighboring joint density feature of the image and a neighboring joint density feature of the encoded cropped image;
    wherein the steganography is detected in the image based at least in part on a differential ratio feature.

2. The method of claim 1, wherein detecting steganography comprises detecting DCT-embedding based adaptive steganography.

3. The method of claim 1, wherein the image is a JPEG image.

4. The method of claim 1, wherein the cropped image is encoded with the same quantization matrix as the original image.

5. The method of claim 1, wherein the steganography is detected with a support vector machine.

6. A method of detecting YASS steganography in a compressed digital image, comprising:
    decoding the image under scrutiny to a spatial domain;
    dividing the decoded image into a plurality of blocks;
    searching blocks possibly used for information hiding;
    determining an absolute DCT coefficient array for at least part of the candidate blocks for information hiding;
    extracting one or more neighboring joint density features from the absolute DCT coefficient array; and
    extracting one or more neighboring joint density features for one or more non-candidate neighboring blocks; and
    detecting steganography in the image based on differences among one or more values of neighboring joint density for candidates and non-candidate neighbors.

7. The method of claim 6, wherein the image is a JPEG image.

8. The method of claim 6, wherein the DCT coefficients for the candidate blocks are quantized using the same quantization matrix as the original image.

9. The method of claim 6, wherein the steganography is detected in the image based at least in part on a differential ratio feature.

10. The method of claim 6, wherein the steganography is detected with a support vector machine.

11. A method of detecting hidden material in a compressed digital image, comprising:
   determining one or more values associated with neighboring joint density for a first image;
   determining one or more values associated with neighboring joint density for a second image related to the first image; and
   detecting steganography in the image based on at least one difference between values associated with neighboring joint density of the first image and values associated with neighboring joint density feature of the second image;
   wherein determining one or more values for neighboring joint density for a first image comprises extracting neighboring joint density features of a DCT coefficient array.

12. The method claim 11, wherein the first image is an image under scrutiny and the second image is a cropped image derived from the image under scrutiny.

13. The method of claim 11, wherein determining one or more values for neighboring joint density for a first image comprises extracting neighboring joint density features of an absolute DCT coefficient array.

14. The method of claim 11, wherein at least some of the one or more values for neighboring joint density are determined on intra-block.

15. The method of claim 11, wherein at least some of the one or more values for neighboring joint density are determined on inter-block.

16. The method of claim 11, wherein the first image is a JPEG cover and the second image is a JPEG steganogram.

17. The method of claim 11, wherein the first image and the second image are JPEG files.

18. A system, comprising:
   a processor;
   a memory coupled to the processor, wherein the memory comprises a program residing in a non-transitory, computer-readable storage medium, wherein the program instructions are executable by the processor to implement:
   determining one or more values associated with neighboring joint density for a first image;
   determining one or more values associated with neighboring joint density for a second image related to the first image; and
   detecting steganography in the image based on at least one difference between values associated with neighboring joint density of the first image and values associated with neighboring joint density feature of the second image;
   wherein determining one or more values for neighboring joint density for a first image comprises extracting neighboring joint density features of a DCT coefficient array.

19. A non-transitory, computer-readable storage medium comprising program instructions stored thereon, wherein the program instructions are configured to implement:
   determining one or more values associated with neighboring joint density for a first image;
   determining one or more values associated with neighboring joint density for a second image related to the first image; and
   detecting steganography in the image based on at least one difference between values associated with neighboring joint density of the first image and values associated with neighboring joint density feature of the second image;
   wherein determining one or more values for neighboring joint density for a first image comprises extracting neighboring joint density features of a DCT coefficient array.

\* \* \* \* \*